(12) United States Patent
Suda et al.

(10) Patent No.: US 7,098,954 B2
(45) Date of Patent: Aug. 29, 2006

(54) INTERCHANGEABLE LENS VIDEO CAMERA SYSTEM

(75) Inventors: Hirofumi Suda, Yokohama (JP); Hiroto Ohkawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 10/122,343

(22) Filed: Apr. 16, 2002

(65) Prior Publication Data

US 2002/0109784 A1  Aug. 15, 2002

Related U.S. Application Data

(62) Division of application No. 08/667,881, filed on Jun. 20, 1996, now Pat. No. 6,373,524.

(30) Foreign Application Priority Data

| Jun. 22, 1995 | (JP) | 7-156138 |
| Jun. 22, 1995 | (JP) | 7-156142 |
| Jun. 23, 1995 | (JP) | 7-157775 |
| Jun. 23, 1995 | (JP) | 7-157776 |

(51) Int. Cl.
G03B 13/00 (2006.01)

(52) U.S. Cl. .................. 348/347; 348/240.99

(58) Field of Classification Search ................ 348/345, 348/346, 347, 354, 351, 353, 240.99, 240.3, 348/243, 235; 396/121, 123

See application file for complete search history.

(56) References Cited

U.S. PATENT DOCUMENTS

| 4,975,726 A | 12/1990 | Kuga et al. ............... 348/349 |
| 5,038,163 A | 8/1991 | Hirasawa .................. 396/89 |
| 5,115,262 A | 5/1992 | Komiya .................... 348/352 |
| 5,157,431 A | 10/1992 | Mabuchi et al. ........... 396/80 |
| 5,337,084 A | 8/1994 | Nakamura ................. 348/353 |
| 5,369,461 A | 11/1994 | Hirasawa et al. .......... 386/117 |
| 5,387,960 A | 2/1995 | Hirasawa et al. .......... 348/345 |
| 5,402,174 A | 3/1995 | Takahashi ................. 348/347 |
| 5,434,637 A | 7/1995 | Ohta ........................ 396/529 |
| 5,475,429 A | 12/1995 | Kodama .................... 348/350 |
| 5,534,923 A | 7/1996 | Suda ........................ 348/354 |
| 5,543,839 A | 8/1996 | Suda et al. ................ 348/349 |
| 5,600,371 A | 2/1997 | Arai et al. ................ 348/345 |
| 5,623,309 A | 4/1997 | Yoshimura et al. ......... 348/355 |
| 5,739,858 A | 4/1998 | Suda et al. ................ 348/355 |
| 6,683,652 B1 * | 1/2004 | Ohkawara et al. ......... 348/347 |

FOREIGN PATENT DOCUMENTS

JP  05005822 A  *  1/1993

* cited by examiner

*Primary Examiner*—Aung Moe
(74) *Attorney, Agent, or Firm*—Morgan & Finnegan, LLP

(57) ABSTRACT

In an interchangeable lens assembly video camera system including an interchangeable lens assembly and a camera, a filter of an AF signal processing circuit (113) of the camera extracts a focus evaluation value signal from an image sensing signal corresponding to one or a plurality of focus detection areas in an image sensing surface, and on the basis of the transmitted focus evaluation value signal from the camera and data stored in a ROM (120), the microcomputer (116) performs a zooming operation of a zoom lens (102) while maintaining an in-focus state of a focus lens (105).

11 Claims, 16 Drawing Sheets

FIG. 10A

| | CAMERA MAIN BODY → LENS ASSEMBLY | LENS ASSEMBLY → CAMERA MAIN BODY |
|---|---|---|
| WORD 0 EVALUATION VALUE Ver | Ver. 1 | Ver. 2 |
| WORD 2 EVALUATION VALUE 1 | TE PEAK EVALUATION VALUE 1 | TE PEAK EVALUATION VALUE 2 |
| WORD 2 EVALUATION VALUE 2 | FE PEAK EVALUATION VALUE 1 | FE PEAK EVALUATION VALUE 2 |
| WORD 3 EVALUATION VALUE 3 | TE LINE PEAK INTEGRAL EVALUATION VALUE 1 | TE LINE PEAK INTEGRAL EVALUATION VALUE 2 |
| WORD 4 EVALUATION VALUE 4 | FE LINE PEAK INTEGRAL EVALUATION VALUE 1 | FE LINE PEAK INTEGRAL EVALUATION VALUE 2 |
| WORD 05 EVALUATION VALUE 5 | Y PEAK EVALUATION VALUE 1 | Y PEAK EVALUATION VALUE 2 |
| WORD 05 EVALUATION VALUE 6 | Max-Min EVALUATION VALUE 1 | Max-Min EVALUATION VALUE 2 |

FIG. 10B

| | LENS ASSEMBLY → CAMERA MAIN BODY | |
|---|---|---|
| WORD 0 AF CONTROL Ver | Ver. 1 | Ver. 2 |

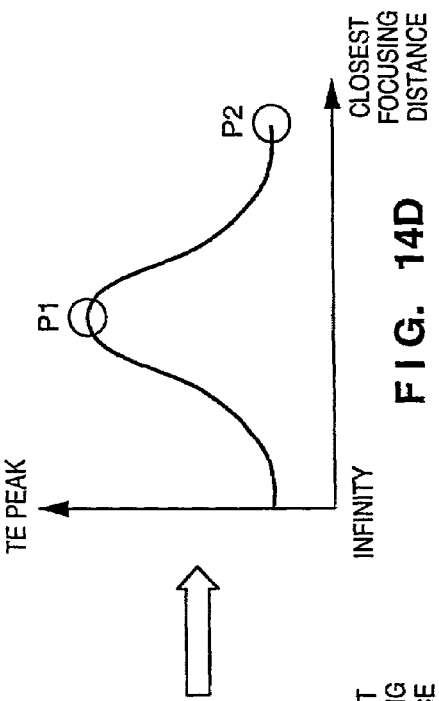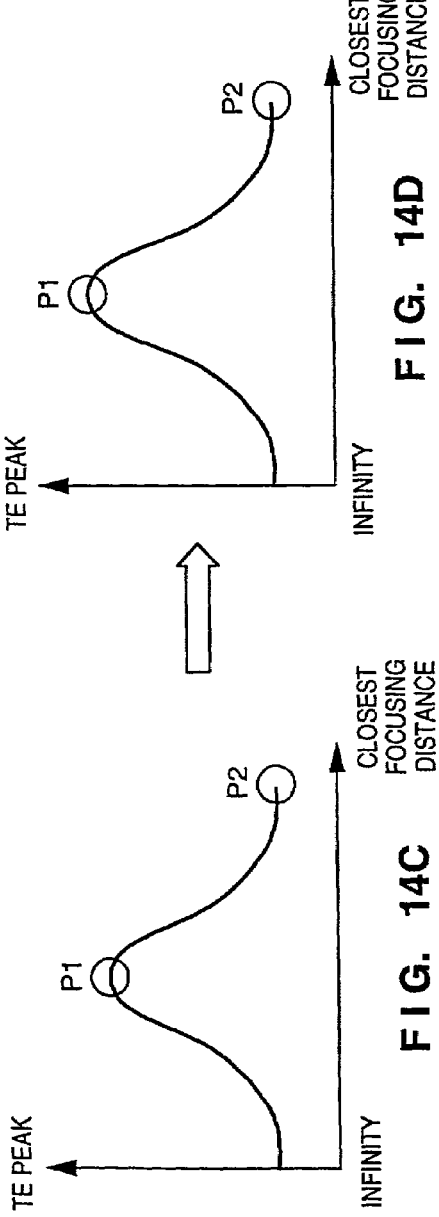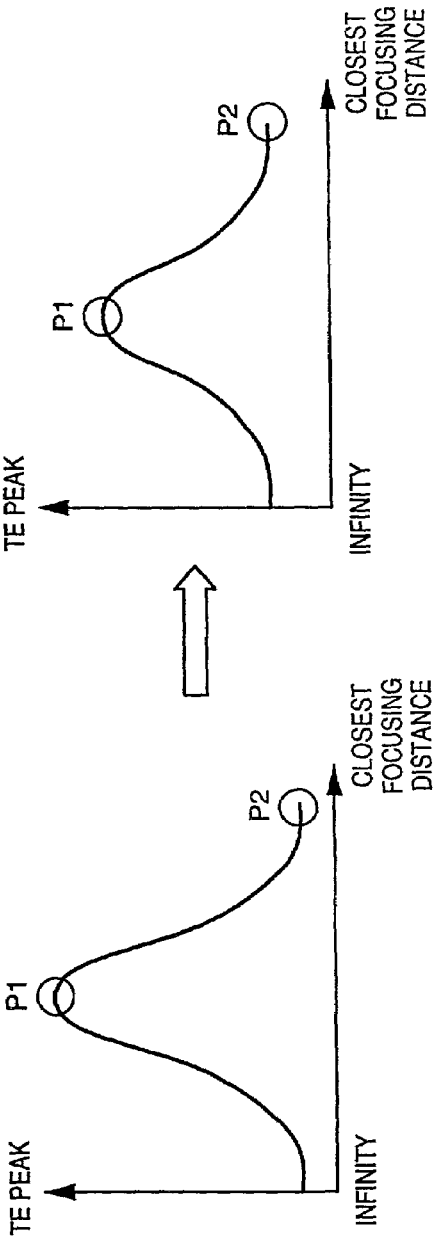

INTERCHANGEABLE LENS VIDEO CAMERA SYSTEM

This is divisional of application Ser. No. 08/667,881, filed Jun. 20, 1996 now U.S. Pat. No. 6,373,527.

BACKGROUND OF THE INVENTION

The present invention relates to a video camera system whose lens assemblies are interchangeable.

Conventionally, a so-called hill-climbing method is known as the method of an automatic focusing device used in video apparatuses such as video cameras. The method performs focusing by extracting a high-frequency component from an image sensing signal obtained by an image sensing device such as a CCD and driving a taking lens such that the mountain-like characteristic curve of this high-frequency component is a maximum.

This automatic focusing method requires neither emission/reception of infrared rays nor special focusing optical members for detecting the movement of an image which changes in accordance with the state of a focus. The method also has an advantage in that an object can be accurately focused regardless of whether the distance to the object is long or short.

An example in which an automatic focusing method of the above sort is applied to an interchangeable lens video camera will be described below with reference to FIG. 15.

FIG. 15 is a block diagram showing an interchangeable lens video camera system as one prior art.

In FIG. 15, an automatic focusing system comprises a lens assembly 500 and a camera main body 550. Focusing is performed by driving a focus lens 501 in the direction of an optical axis by a lens driving motor 511. An image of light transmitting through this lens is formed on the image sensing surface of an image sensing device 502 and changed into an electrical signal by photoelectric conversion. This electrical signal is output as a video signal. The video signal is sampled-and-held and amplified to a predetermined level by a CDS/AGC (Correlated Double Sampling/Auto Gain Control) circuit 503, and converted into digital video data by an A/D (Analog/Digital) converter 504. The data is input to a process circuit (not shown) of the camera and converted into a standard television signal. The data is also input to a bandpass filter (to be referred to as BPF hereinafter) 505.

The BPF 505 extracts a high-frequency component from the video signal. A gate circuit 506 extracts only a signal corresponding to a portion set in an in-focus designated area in an image sensing surface. A peak hold circuit 507 holds peak values at intervals synchronized with integral multiples of a vertical sync signal, generating an AF (AutoFocus) evaluation value.

An AF microcomputer 508 of the camera main body 550 fetches this AF evaluation value and determines the driving velocity of a focus motor 511 in accordance with an in-focus degree and the driving direction of the motor along which the AF evaluation value increases. The AF microcomputer 508 transmits the driving velocity and the driving direction of the focus motor 511 to a microcomputer 509 of the lens assembly 500.

In accordance with the designations from the AF microcomputer 508 of the camera main body 550, the microcomputer 509 operates the focus motor 511 via a motor driver 510 to drive the focus lens 501 in the optical axis direction, thereby performing focusing.

In the above prior art, however, the camera main body has the function of controlling automatic focusing in order to allow an interchange of lenses. Therefore, if, for example, the response characteristics of automatic focusing are so determined as to be optimum for a specific lens, the characteristics may not be optimum for other lenses, resulting in a low versatility.

A problem arising when an interchangeable lens is a zoom lens will be described below with reference to FIG. 16.

FIG. 16 is a block diagram of an interchangeable zoom lens video camera system as another prior art.

In a conventional variable power lens assembly, a variable power lens 21 and a compensating lens 22 are mechanically connected by a cam. When a zooming operation is manually or electrically performed, the variable power lens 21 and the compensating lens 22 integrally move.

These variable power lens 21 and compensating lens 22 are called zoom lenses. In this lens system, a lens (front lens) 1 which is closest to an object when the image is taken is a focus lens. The focus lens 1 moves in the direction of an optical axis to perform focusing.

An image of light transmitting through these lenses is formed on the image sensing surface of an image sensing device 3, photoelectrically converted into an electrical signal, and output as a video signal. This video signal is sampled-and-held (correlated double sampling) by a CDS/AGC circuit 4, amplified to a predetermined level by AGC (Auto Gain Control), and converted into digital video data by an A/D converter 5. The digital video data is input to a subsequent camera process circuit (not shown) and converted into a standard television signal. The data is also input to an AF signal processing circuit 6.

The AF signal processing circuit 6 extracts a high-frequency component which changes in accordance with the focus state from the video signal. A microcomputer 7 for controlling the system fetches this high-frequency component as an AF evaluation value.

The microcomputer 7 determines the driving velocity of a focus motor in accordance with the in-focus degree and the driving direction of the motor along which the AF evaluation value increases. The microcomputer 7 sends the velocity and the direction of the focus motor to a focus motor driver 9 of a lens assembly 12 and drives the focus lens 1 via a focus motor 10.

The microcomputer 7 also reads the state of a zoom switch 8 and, in accordance with the operation state of the zoom switch 8, determines the driving directions and the driving velocities of the zoom lenses 21 and 22. The microcomputer 7 transmits these driving directions and driving velocities to a zoom motor driver 11 of the lens assembly 12 and drives the zoom lenses 21 and 22 via a zoom motor 12.

A camera main body 13 can be separated from the lens assembly 12 and connected to another lens assembly. This widens the range of shooting.

In recent integrated cameras for consumers having the above structure, the cam for mechanically connecting the compensating lens with the variable power lens is no longer used in order to miniaturize a camera and enable shooting at a close distance such as when an object is almost at the front surface of the lens. In these cameras, the locus of movement of the compensating lens is previously stored as lens cam data in a microcomputer, and the compensating lens is driven in accordance with this lens cam data. Also, a focusing operation is performed by using this compensating lens. Lenses of this type, i.e., so-called inner focus type (rear focus type) lenses have become most popular.

According to the technical concept of the above prior art, however, all control operations are done in the camera main body, and the lens assembly is driven in accordance with control signals supplied from the camera main body. Therefore, to use an inner focus type lens as an interchangeable lens assembly, the camera main body must have the data of the locus of movement of the focus lens, i.e., the lens cam data, for maintaining the in-focus state by compensating for a change in the focal plane caused by a zooming operation.

This, however, imposes on the camera main body the serious burden of having the lens cam data which differs from one lens assembly to another. Accordingly, the method becomes unrealistic as the number of interchangeable lenses increases.

SUMMARY OF THE INVENTION

The present invention has been made in consideration of the above situation, and has as its object to provide an interchangeable lens (assembly) video camera system capable of performing optimum automatic focusing with not only a front focus type lens assembly but also an inner focus type lens assembly.

A video camera system of the present invention and a camera and a lens assembly constituting the system have the following characteristic features.

There is provided a lens assembly which can be detachably attached to a camera including focus detecting means, comprising receiving means for receiving a focus signal transmitted from the camera, control means for checking an in-focus state on the basis of the focus signal and determining a driving direction and a driving velocity of a focus lens of the lens assembly, and driving means for driving the focus lens in accordance with the driving direction and the driving velocity.

There is also provided a camera to which a lens assembly can be detachably attached, comprising extracting means for extracting a focus signal from an image sensing signal corresponding to an interior of one or a plurality of focus detection areas in an image sensing surface of the camera, and transmitting means for transmitting the focus signal to the lens assembly.

There is further provided a video camera system constituted by the above lens assembly and camera.

There is further provided a lens assembly which can be detachably attached to a camera including focus detecting means, comprising receiving means for receiving a focus signal and a state of a switch for manipulating a zooming operation, both of which are transmitted from the camera, a zoom lens for performing a zooming operation, a focus lens for maintaining an in-focus state during the zooming operation, memory means for storing data representing a positional relationship between the zoom lens and the focus lens, zoom lens driving means for driving the zoom lens in accordance with the state of the switch, control means for checking the in-focus state on the basis of the focus signal and determining a driving direction and a driving velocity of the focus lens while compensating for a movement of a focal plane caused by the zooming operation of the zoom lens on the basis of the data, and focus lens driving means for driving the focus lens in accordance with the driving direction and the driving velocity.

There is further provided a camera to which a lens assembly can be detachably attached, comprising extracting means for extracting a focus signal from an image sensing signal corresponding to an interior of one or a plurality of focus detection areas in an image sensing surface of the camera, a switch for manipulating a zooming operation of a zoom lens of the lens assembly, and transmitting means for transmitting the focus signal and a state of the switch to the lens assembly.

There is further provided a video camera system constituted by the above lens assembly and camera, wherein the lens assembly controls the operation of the focus lens.

In any of the above constructions, the extracting means comprises a plurality of filter means for extracting a signal of a predetermined frequency component as the focus signal from the image sensing signal.

The extracting means further comprises peak value detecting means for detecting a peak value of a luminance component in the image sensing signal.

The extracting means further comprises contrast component detecting means for detecting a contrast component in the image sensing signal.

The extracting means further comprises peak holding means for detecting the contrast component by holding a peak value of a difference between a maximum value and a minimum value of the luminance component.

The camera may further comprise a switch for permitting an automatic focusing operation, and the lens assembly may control the focus lens when the switch permits the automatic focusing operation.

The camera may further comprise normalizing means for normalizing the output from the extracting means and, when an image of a specific object is taken, substantially the same focus signal may be output to the lens assembly under the same taking conditions even if the characteristics of cameras vary.

Data representing the type of the focus signal may be transmitted between the camera and the lens assembly, and the control of the focus lens may be changed in accordance with the type signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A and 10B are views showing details of the evaluation values and version information exchanged between the camera and the lens according to the first modification of the embodiment of the present invention;

FIGS. 14A to 14D are illustrations for explaining the processing done by an evaluation value normalizing circuit 132 which constitutes a normalizing means in the embodiment of the present invention;

DETAILED DESCRIPTION OF THE PREFERRED EMBODIMENT

Figure 1:
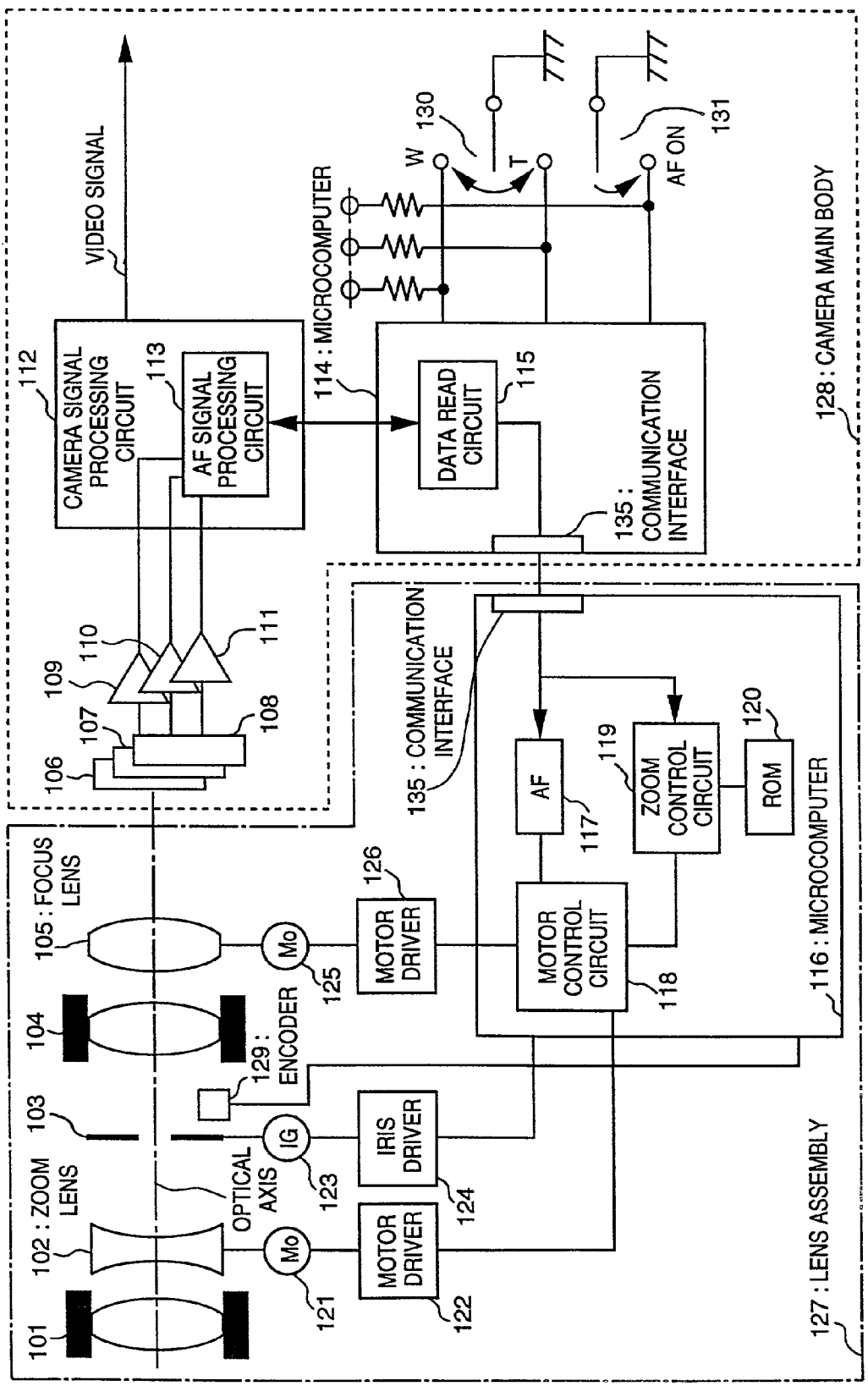
FIG. 1 is a block diagram of an interchangeable lens video camera system according to an embodiment of the present invention.

A preferred embodiment of the present invention will be described in detail in accordance with the accompanying drawings. FIG. 1 is a block diagram of an interchangeable lens video camera system according to an embodiment of the present invention.

Referring to FIG. 1, a lens assembly 127 is detachably attached to a main body 128 of the camera to constitute a so-called interchangeable lens system.

An image of light from an object is formed by image sensing devices 106 to 108, e.g., CCDs, in the camera main body through a fixed first lens group 101, a second lens group 102 for performing a zooming operation, an iris stop 103, a fixed third lens group 104, and a fourth lens group 105 (to be referred to as a focus lens hereinafter) in the lens assembly 127. The fourth lens 105 has both a focusing function and a function of compensating for the movement of a focal plane caused by zooming.

The image pick devices 106, 107, and 108 in the camera main body 128 are provided for three primary colors, red (R), green (G), and blue (B), respectively, constituting a so-called three-sensor image sensing system.

Images of the three primary colors, red, green, and blue, are formed on the image sensing devices 106, 107, and 108, respectively.

The images formed on the image sensing devices 106, 107, and 108 are photoelectrically converted and amplified to their respective optimum levels by amplifiers 109, 110, and 111, respectively. These images are then input to a camera signal processing circuit 112 and converted into a standard television signal. This signal is output to, e.g., a video recorder (not shown) and also input to an autofocus (AF) signal processing circuit 113.

An AF evaluation value generated by the AF signal processing circuit 113 is read out at a period which is an integral multiple of a vertical sync signal by a data read circuit 115 of a microcomputer 114 in the camera main body 128. The readout AF evaluation value is transferred to a microcomputer 116 of the lens assembly 127 via communication interfaces 135 and 136.

In the camera signal processing circuit 112, the levels of luminance signals of the output image sensing signals from the image sensing devices are detected and transferred from the microcomputer 114 to the microcomputer 116 of the lens assembly 127 via the communication interfaces 135 and 136. On the basis of this luminance signal information, an iris driver 124 is controlled, an IG (Iris Galvano) meter 123 is driven, and the iris stop 103 is controlled.

The aperture value of the iris stop 103 is detected by an encoder 129, supplied to the microcomputer 116, and used as depth-of-field information.

The microcomputer 114 of the camera 128 transmits the states of a zoom switch 130 and an AF switch 131 (when ON, an AF operation is performed; when OFF, a manual focus mode is set) to the microcomputer 116 of the lens via the communication interfaces 135 and 136.

In the microcomputer 116 of the lens, an AF arithmetic circuit 117 receives the state of the AF switch 131 and the AF evaluation value from the microcomputer 114 of the camera 128. When the AF switch 131 is ON, the AF arithmetic circuit 117 operates a motor control circuit 118 on the basis of the AF evaluation value, driving a focus motor 125 by a focus motor driver 126 and moving the focus lens 105 in the optical axis direction to perform focusing.

The microcomputer 116 also receives the manipulated state of the zoom switch 130. In accordance with this manipulated state, the microcomputer 116 controls a motor driver 122 to drive a zoom motor 121, driving the zoom lens 102 to perform a zooming operation.

The lens assembly is of an inner focus type, so the focal plane moves when the zoom lens 102 is driven. Therefore, the focus lens 105 is driven in accordance with predetermined characteristics as the zoom lens 102 is driven, thereby simultaneously performing an operation of preventing a blur (out of focus) caused by the displacement of the focal plane.

To perform this operation, lens cam data, i.e., a locus indicating a change in in-focus position of the focus lens with a change in the position of the zoom lens is stored in a ROM 120 of the microcomputer 116 advance in accordance with the distance to an object.

Also, a zoom control circuit 119 reads out the locus (lens cam data) to be traced by the focus lens 105 during a zooming operation from the ROM 120 and thereby controls driving of the focus lens 104.

When the information from the microcomputer 114 of the camera main body indicates that the AF switch 131 is OFF (manual focus mode) and the zoom switch 130 is depressed, the zoom control circuit 119 specifies the in-focus locus along which the focus lens 105 is to trace during a zooming operation and the trace direction, in accordance with the information of the zoom direction operated by the zoom switch 130 and with the position information obtained by detecting the positions of the zoom lens 102 and the focus lens 105 from the respective motor driving amounts or by using the encoder. The zoom control circuit 119 reads out the specified locus and trace direction from the ROM 120 and calculates the compensating velocity and direction of the focus lens corresponding to the zooming operation.

The information of the compensating velocity and direction is supplied to the focus motor driver 126 to drive the focus motor 125. Consequently, the focus lens is driven to prevent a blur which occurs when the focal point shifts during the zooming operation.

When the AF switch 131 is ON and the zoom switch 130 is depressed, it is necessary to hold the in-focus state even if the object moves. Accordingly, the zoom control circuit 119 not only performs control on the basis of the lens cam data stored in the ROM 120 of the microcomputer 116 as described above but also simultaneously refers to the AF evaluation value signal sent from the microcomputer 114 of the camera, thereby performing a zooming operation while holding the position at which the AF evaluation value is a maximum.

That is, the driving velocity and the driving direction of the focus lens 105 are calculated by adding the information of the compensating velocity and direction of the focus lens obtained by the zoom control circuit 119 in accordance with the zooming operation to the information of the driving velocity and direction of the focus lens based on the output focus movement information, obtained by AF processing, from the AF circuit 117. The driving velocity and direction thus calculated are supplied to the focus motor driver 126.

When the AF switch 131 is ON and the zoom switch 130 is not depressed, the AF circuit 117 in the microcomputer 116 receives the AF evaluation value transmitted from the microcomputer 114 of the camera 128. On the basis of this AF evaluation value, the motor control circuit 118 is operated, the focus motor 125 is driven by the focus motor driver 126, and focusing is performed by moving the focus lens 105 in the optical axis direction so that the AF evaluation value is maximum.

The aperture value of the iris stop 103 is detected by the encoder 129, supplied to the microcomputer 116, and used as the depth-of-field information to compensate for, e.g., the velocity of the focus lens 105.

[Autofocus Operation]

Figure 2:
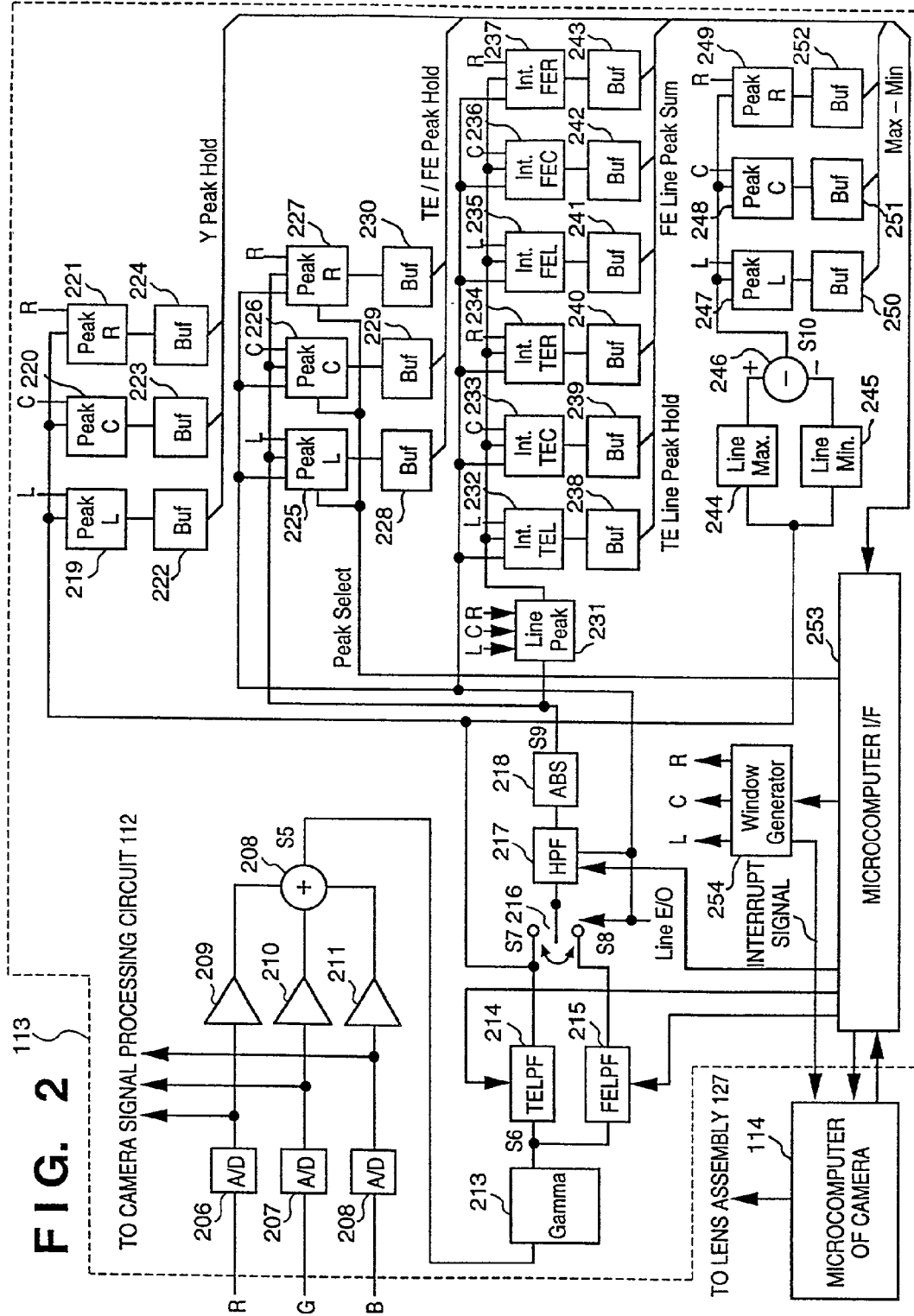
FIG. 2 is a block diagram showing an internal configuration of an AF signal processing circuit of the camera according to the embodiment of the present invention.

The AF signal processing circuit 113 in the camera signal processing circuit 112 will be described below with reference to FIG. 2. FIG. 2 is a block diagram showing the internal configuration of the AF signal processing circuit of the camera according to the embodiment of the present invention. Referring to FIG. 2, the image sensing device outputs of red (R), green (G), and blue (B) are amplified to their respective optimum levels by amplifiers 109, 110, and 111 and supplied to the AF signal processing circuit 113. The output signals are converted into digital signals by A/D converters 206, 207, and 208 and supplied to the camera signal processing circuit 112. At the same time, these digital signals are amplified to their respective optimum levels by amplifiers 209, 210, and 211 and added by an adder 208, generating an automatic focusing luminance signal S5.

The luminance signal S5 is input to a gamma circuit 213 and gamma-converted in accordance with a preset gamma curve, forming a signal S6 whose low-luminance component is increased and high-luminance component is decreased. The gamma-converted signal S6 is applied to a low-pass filter (to be referred to as an LPF hereinafter) with a high cut-off frequency, i.e., a TE-LPF 214, and to an FE-LPF 215 which is an LPF with a low cut-off frequency. The TE-LPF 214 and the FE-LPF 215 extract low-frequency components on the basis of the respective filter characteristics determined by the microcomputer 114 via a microcomputer interface 253. Consequently, the TE-LPF 214 generates an output signal S7, and the FE-LPF 215 generates an output signal S8.

A line E/O signal is generated by the microcomputer 114 to identify whether the horizontal line is an even-numbered line or an odd-numbered line. On the basis of this signal, the signals S7 and S8 are switched by a switch 216 and applied to a high-pass filter (to be referred to as an HPF hereinafter) 217.

That is, the signal S7 is supplied to the HPF 217 when the horizontal line is an even-numbered line, and the signal S8 is supplied to the HPF 217 when the horizontal line is an odd-numbered line.

The HPF 217 extracts only a high-frequency component in accordance with filter characteristics determined for even- and odd-numbered lines by the microcomputer 114 via the microcomputer interface 253. An absolute value circuit 218 obtains an absolute value of the extracted signal to generate a positive signal S9. That is, the signal S9 alternately indicates the levels of high-frequency components extracted by the filter having different filter characteristics for even- and odd-numbered lines. Consequently, different frequency components can be obtained by scanning one picture frame.

Figure 3:
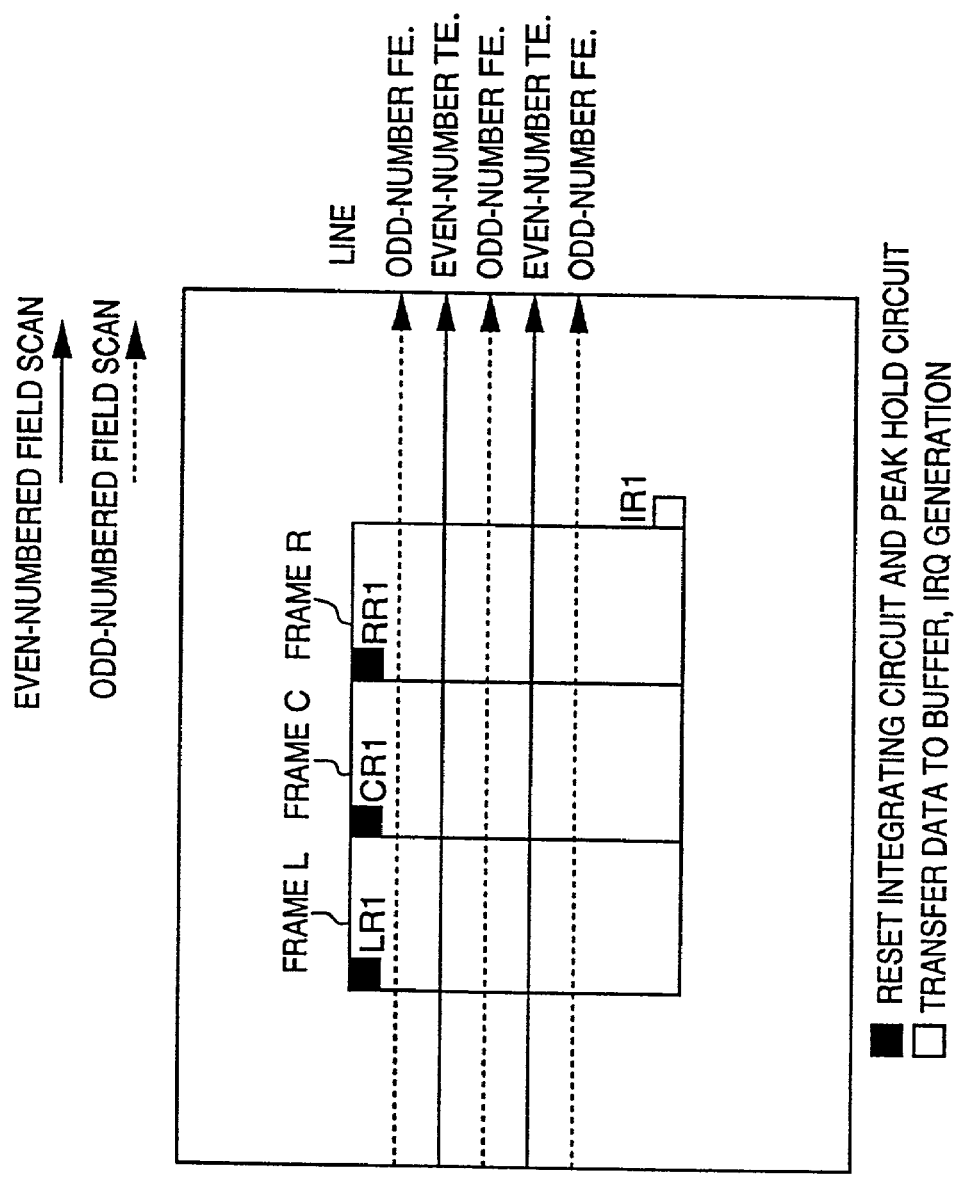
FIG. 3 is a view for explaining the operations and timings of extraction of various focus evaluation values according to the embodiment of the present invention.

In accordance with an instruction supplied by the microcomputer 114 via the microcomputer interface 253, a frame generating circuit 254 generates gate signals L, C, and R for forming focus control gate frames L, C, and R, respectively, at positions in the image sensing surface as shown in FIG. 3.

Timings at which various kinds of information are fetched in the AF signal processing circuit 113 will be described below with reference to FIG. 3 which shows the layout of focus detection areas in the image sensing surface.

FIG. 3 is a view for explaining the operations and timings of extraction of various focus evaluation values in the embodiment of the present invention. Referring to FIG. 3, the outside frame is an effective image sensing surface of the outputs from the image sensing devices 106, 107, and 108.

Three divided inside frames are focus detection gate frames. A left frame L, a central frame C, and a right frame R are formed in accordance with the frame L generating gate signal, the frame C generating gate signal, and the frame R generating gate signal, respectively, from the frame generating circuit 254.

At the start positions of these frames L, C, and R, reset signals are output for the frames L, C, and R to generate initialization (reset) signals LR1, CR1, and RR1, respectively, thereby resetting integrating circuits 232 to 237 and peak hold circuits 219 to 221, 225 to 227, and 247 to 249.

Also, when the focus detection area consisting of the frames L, C, and R is completely scanned, a data transfer signal IR1 is generated to transfer the integral values of the integrating circuits and the peak hold values of the peak hold circuits to their respective buffers.

Referring to FIG. 3, the scan of an even-numbered field is indicated by the solid lines, and the scan of an odd-numbered field is indicated by the dotted lines. In both the even- and odd-numbered fields, the TE-LPF output is selected on an even-numbered line, and the FEL-PF output is selected on an odd-numbered line.

Automatic focusing performed by the microcomputer by using a TE/FE peak evaluation value, a TE line peak integral evaluation value, an FE line peak integral evaluation value, a Y signal peak evaluation value, and a Max-Min evaluation value in each frame. Note that these evaluations values are transmitted to the microcomputer 116 in the lens assembly and the microcomputer 116 performs actual control.

The signal S9 is supplied to the peak hold circuits 225, 226, and 227 for detecting signal peak values in the left, central, and right frames, i.e., the frames L, C, and R, in the image sensing surface. These peak hold circuits detect the peak values of high-frequency components in their respective frames. The signal S9 is also supplied to the line peak hold circuit 231 to detect the peak value of each horizontal line.

The peak hold circuit 225 receives the output gate signal L for forming the frame L from the frame generating circuit 254, the signal S9, and the Line E/O signal. As shown in FIG. 3, the peak hold circuit 225 is initialized in the upper left corner, LR1, which is the start position of the focusing frame L. The peak hold circuit 225 holds a peak value of the signal S9 in the frame L of either an even- or odd-numbered line designated by the microcomputer 114 via the microcomputer interface 253. In the lower right corner IR1, i.e., when the entire focusing area is completely scanned, the peak hold value in the frame L is transferred to the area buffer 228 to generate a TE/FE peak evaluation value.

Likewise, the peak hold circuit 226 receives the output frame C signal from the frame generating circuit 254, the Line E/O signal, and the signal S9. As in FIG. 3, the peak hold circuit 226 is initialized in the upper left corner, CR1, which is the start position of the focusing frame C. The peak hold circuit 226 holds a peak value of the signal S9 in the frame C of either an even- or odd-numbered line designated by the microcomputer 114 via the microcomputer interface 253. In IR1, i.e., when the overall focusing area is completely scanned, the peak hold value in the frame C is transferred to the area buffer 229 to generate a TE/FE peak evaluation value.

Similarly, the peak hold circuit 227 receives the output frame R signal from the frame generating circuit 254, the Line E/O signal, and the signal S9. As in FIG. 3, the peak hold circuit 227 is initialized in the upper left corner, RR1, which is the start position of the focusing frame R. The peak hold circuit 227 holds a peak value of the signal S9 in the frame R of either an even- or odd-numbered line designated by the microcomputer 114 via the microcomputer interface 253. In IR1, i.e., when the overall focusing area is completely scanned, the peak hold value in the frame R is transferred to the area buffer 230 to generate a TE/FE peak evaluation value.

The line peak hold circuit 231 receives the signal S9 and the output gate signals for generating the frames L, C, and R from the frame generating circuit 254. The line peak hold circuit 231 is initialized at the start point in the horizontal direction of each frame and holds a peak value of each line in the horizontal line of the signal S9 in each frame.

The integrating circuits 232, 233, 234, 235, 236, and 237 receive the output from the line peak hold circuit 231 and the Line E/O signal which identifies whether the horizontal line is an even- or odd-numbered line. The integrating circuits 232 and 235 receive the frame L generating gate signal supplied from the frame generating circuit 254. The integrating circuits 233 and 236 receive the frame C generating gate signal supplied from the frame generating circuit 254. The integrating circuits 234 and 237 receive the frame R generating gate signal supplied from the frame generating circuit 254.

The integrating circuit 232 is initialized in the upper left corner, LR1, which is the start position of the focusing frame L. The integrating circuit 232 adds the output from the line peak hold circuit 231 to an internal register immediately before the end of an even-numbered line in each frame. In IR1, the integrating circuit 232 transfers the peak hold value to the area buffer 238 to generate a TE line peak integral evaluation value.

The integrating circuit 233 is initialized in the upper left corner, CR1, which is the start position of the focusing frame C. The integrating circuit 233 adds the output from the line peak hold circuit 231 to an internal register immediately before the end of an even-numbered line in each frame. In IR1, the integrating circuit 233 transfers the peak hold value to the area buffer 239 to generate a TE line peak integral evaluation value.

The integrating circuit 234 is initialized in the upper left corner, RR1, which is the start position of the focusing frame R. The integrating circuit 234 adds the output from the line peak hold circuit 231 to an internal register immediately before the end of an even-numbered line in each frame. In IR1, the integrating circuit 234 transfers the peak hold value to the area buffer 240 to generate a TE line peak integral evaluation value.

The integrating circuits 235, 236, and 237 perform the same operations as the integrating circuits 232, 233, and 234, respectively, except that the integrating circuits 235, 236, and 237 perform addition of odd-numbered line data, instead of performing addition of even-numbered line data such as done by the integrating circuits 232, 233, and 234. The integrating circuits 235, 236, and 237 transfer the results to the area buffers 241, 242, and 243, respectively, generating FE line peak integral evaluation values.

The signal S7 is input to the peak hold circuits 219, 220, and 221, a line maximum value hold circuit 244, and a line minimum value hold circuit 245.

The peak hold circuit 219 receives the frame L generating gate signal supplied from the frame generating circuit 254. The peak hold circuit 219 is initialized in the upper left corner, LR1, which is the start position of the frame L, and holds a peak value of the signal S7 in each frame. In IR1, the peak hold circuit 219 transfers the peak hold result to the buffer 222 to generate a peak evaluation value of a luminance level (to be referred to as a Y signal hereinafter).

Analogously, the peak hold circuit 220 receives the frame C generating gate signal supplied from the frame generating circuit 254. The peak hold circuit 220 is initialized in the upper left corner, CR1, which is the start position of the frame C, and holds a peak value of the signal S7 in each frame. In IR1, the peak hold circuit 220 transfers the peak hold result to the buffer 223 to generate a Y signal peak evaluation value.

Likewise, the peak hold circuit 221 receives the frame R generating gate signal from the frame generating circuit 254. The peak hold circuit 221 is initialized in the upper left corner, RR1, which is the start position of the frame R, and holds the peak value of the signal S7 in each frame. In IR1, the peak hold circuit 221 transfers the peak hold result to the buffer 224 to generate a Y signal peak evaluation value.

The line maximum value hold circuit 244 and the line minimum value hold circuit 245 receive the frame L, C, and R generating gate—signals supplied from the frame generating circuit 254. The line maximum value hold circuit 244 and the line minimum value hold circuit 245 are initialized at the start point in the horizontal direction in each frame and hold the maximum value and the minimum value, respectively, of the Y signal on one horizontal line of the signal S7 in each frame.

The maximum and the minimum values of the Y signal held by the line maximum value hold circuit 244 and the line minimum value hold circuit 245 are input to a subtracter 246. The subtracter 246 calculates a (maximum value– minimum value) signal, i.e., a signal S10 which indicates the contrast, and inputs the signal to the peak hold circuits 247, 248, and 249.

The peak hold circuit 247 is applied with the frame L generating gate signal from the frame generating circuit 254. The peak hold circuit 247 is initialized in the upper left corner, LR1, which is the start position of the frame L, and holds a peak value of the signal S10 in each frame. In IR1, the peak hold circuit 247 transfers the peak hold result to the buffer 250 to generate a Max-Min evaluation value.

Similarly, the peak hold circuit 248 receives the frame C generating gate signal from the frame generating circuit 254. The peak hold circuit 248 is initialized in the upper left corner, CR1, which is the start position of the frame C, and holds a peak value of the signal S10 in each frame. In IR1, the peak hold circuit 248 transfers the peak hold result to the buffer 251 to generate a Max-Min evaluation value.

Analogously, the peak hold circuit 249 is applied with the frame R generating gate signal from the frame generating circuit 254. The peak hold circuit 249 is initialized in the upper left corner, RR1, which is the start position of the frame R, and holds a peak value of the signal S10 in each frame. In IR1, the peak hold circuit 249 transfers the peak hold result to the buffer 252 to generate a Max-Min evaluation value.

In IR1, i.e., when the entire focusing area consisting of the frames L, C, and R is completely scanned, the data in these frames are transferred to the buffers 222, 223, 224, 228, 229, 230, 238, 239, 240, 241, 242, 243, 250, 251, and 252. Simultaneously, the frame generating circuit 254 sends an interrupt signal to the microcomputer 114 and transfers the data, which are transferred to these buffers, to the microcomputer 114.

That is, upon receiving the interrupt signal, the microcomputer 114 reads out the data (focus evaluation values) from the buffers 222, 223, 224, 228, 229, 230, 238, 239, 240, 241, 242, 243, 250, 251, and 252 via the microcomputer interface 253 before the succeeding scan of the frames L, C, and R is completed and the data are transferred to these buffers. As will be described later, the microcomputer 114 transfers the data to the microcomputer 116 in synchronism with a vertical sync signal.

The microcomputer 116 of the lens assembly 127 detects the focus state by performing calculations by using these transferred focus evaluation values. The microcomputer 116 then calculates, e.g., the driving velocity and the driving direction of the focus motor 125 and controls driving of the focus motor 125, thereby driving the focusing lens 105.

The characteristics and applications of the above evaluation values will be described below.

The TE/FE peak evaluation value represents an in-focus degree and is a peak hold value. Therefore, this evaluation value is less influenced by a camera shake and comparatively less depends upon the state of an object. For these reasons, this evaluation value is optimum for in-focus degree determination and reactivation determination.

The TE line peak integral evaluation value and the FE line peak integral evaluation value also represent an in-focus degree. However, these evaluation values are optimum for direction determination since they have little noise and are stable as a result of integration.

Of the above peak evaluation values and line peak integral evaluation values, each TE evaluation value is formed by extracting higher frequencies and hence is optimum as an evaluation value near the in-focus point. In contrast, each FE evaluation value is optimum when an image is largely blurred in a position very far from the in-focus point. Accordingly, by adding these signals or selectively switching the signals in accordance with the TE level, it is possible to perform AF over a wide dynamic range from the state in which an image is largely blurred to the vicinity of the in-focus point.

The Y signal peak evaluation value and the Max-Min evaluation value do not depend much upon the in-focus degree but upon the state of an object. Therefore, these evaluation values are optimum to check the change or movement of an object in order to reliably perform in-focus degree determination, reactivation determination, and direction determination. These values are also used in normalization for removing the influence of a change in brightness.

More specifically, the Y signal peak evaluation value is used to check whether the object is a high-luminance object or a low-luminance object. The Max-Min evaluation value is used to check whether the contrast is high or low. Furthermore, optimum AF control can be performed by predicting and compensating for the peak values, i.e., the magnitudes of peaks, on the characteristic curves of the TE/FE peak evaluation value, the TE line peak integral evaluation value, and the FE line peak integral evaluation value.

These evaluation values are transferred from the camera main body 128 to the lens assembly 127 and supplied to the microcomputer 116 of the lens assembly 127, and the automatic focusing operation is performed.

The algorithm of an automatic focusing operation performed by the microcomputer 116 of the lens assembly 127 will be described below with reference to FIG. 4.

Figure 4:
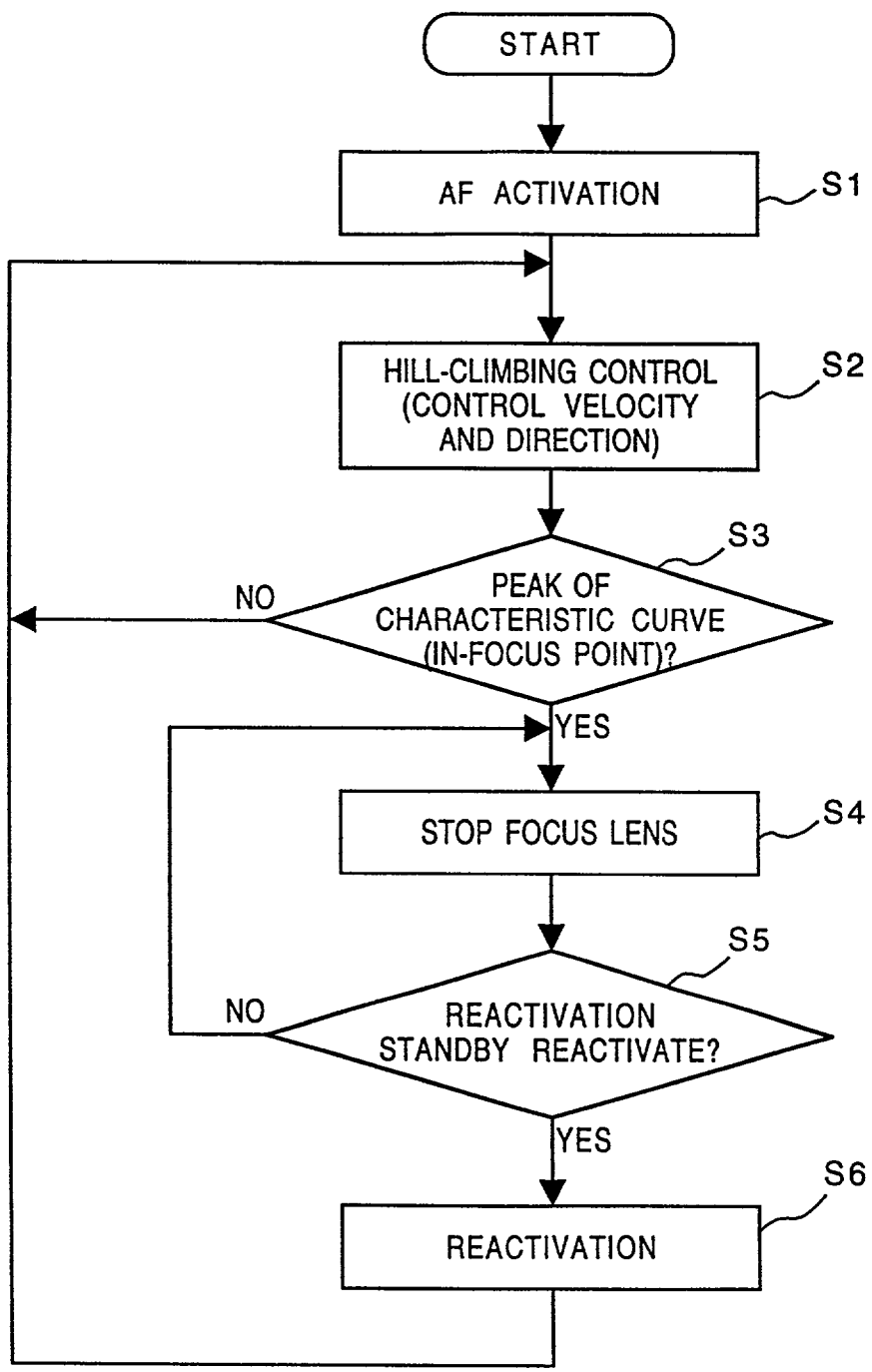
FIG. 4 is a flow chart of AF processing in the embodiment of the present invention.

FIG. 4 is a flow chart of AF processing in this embodiment of the present invention.

When the processing is started, the microcomputer 116 activates the AF operation in step S1, and the flow advances to step S2. In step S2, the microcomputer 116 checks the distance from the in-focus point by comparing the level of the TE or FE peak with a predetermined threshold, and performs velocity control.

If the TE level is low, i.e., if the current focus point is far from the in-focus point and therefore the image is predicted to be largely blurred, the microcomputer 116 performs hill-climbing control for the focus lens by controlling the direction of the lens by primarily using the FE line peak integral evaluation value. When the TE level rises to a certain degree near the peak of the characteristic curve, the microcomputer 116 performs hill-climbing control for the focus lens by using the TE line peak integral evaluation value. In this way, the microcomputer 116 so performs control that the in-focus point can be accurately detected.

If the lens comes close to the focus point, the flow advances to step S3 and the microcomputer 116 determines the peak of the characteristic curve by using the absolute value of the TE or FE peak evaluation value or a change in the TE line peak integral evaluation value. If the microcomputer 116 determines that the level of the evaluation value is highest at the peak, i.e., the in-focus point, the microcomputer 116 stops the focus lens in step S4 and advances to reactivation standby in step S5.

In the reactivation standby, if the microcomputer 116 detects that the level of the TE or FE peak evaluation value decreases by a predetermined level or more from the peak value obtained when the in-focus point is detected, the microcomputer 116 reactivates the operation in step S6.

In the loop of the automatic focusing operation as described above, the velocity of the focus lens is controlled by using the TE/FE peak. The level of the absolute value for determining the peak of the characteristic curve and the change in the TE line peak integral evaluation value are determined by predicting the height of the hill by checking the object by using the Y peak evaluation value or the Max-Min evaluation value. The AF operation can always be performed by repeating the above processing.

Figure 5:
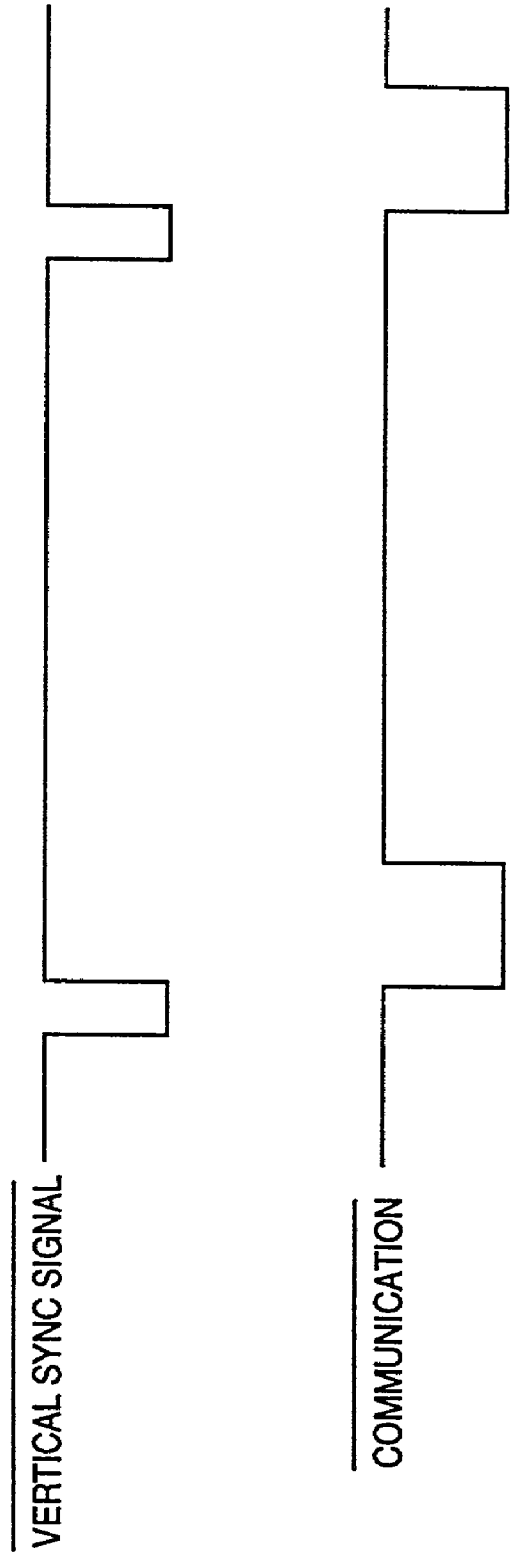
FIG. 5 is a timing chart showing the timings of communications of the AF evaluation values to a lens assembly in the embodiment of the present invention.

FIG. 5 is a timing chart for explaining the timing at which the microcomputer 114 of the camera main body 128 transmits various data such as the AF evaluation value to the microcomputer 116 of the lens assembly 127. As described previously, the timing of communication between the camera main body 128 and the lens assembly 127 is such that the AF evaluation value read out by the microcomputer 114 is transferred to the microcomputer 116 immediately after the next vertical sync signal in synchronism with the vertical sync signal (V synchronization).

As a consequence, the AF operation can be controlled in synchronism with the vertical sync signal.

<Zooming Operation>

The relationship between the movements of the zoom lens 102 and the focus compensating lens 105 and a method of referring to the AF evaluation value signal during a zooming operation from wide to telephoto will be described below.

In the lens system as illustrated in FIG. 1, the focus lens 105 has both the compensating function and the focusing function. Accordingly, the position of the focus lens 105 for focusing an image on the image sensing devices 106, 107, and 108 change in accordance with the object distance even at the same focal length.

Figure 6:
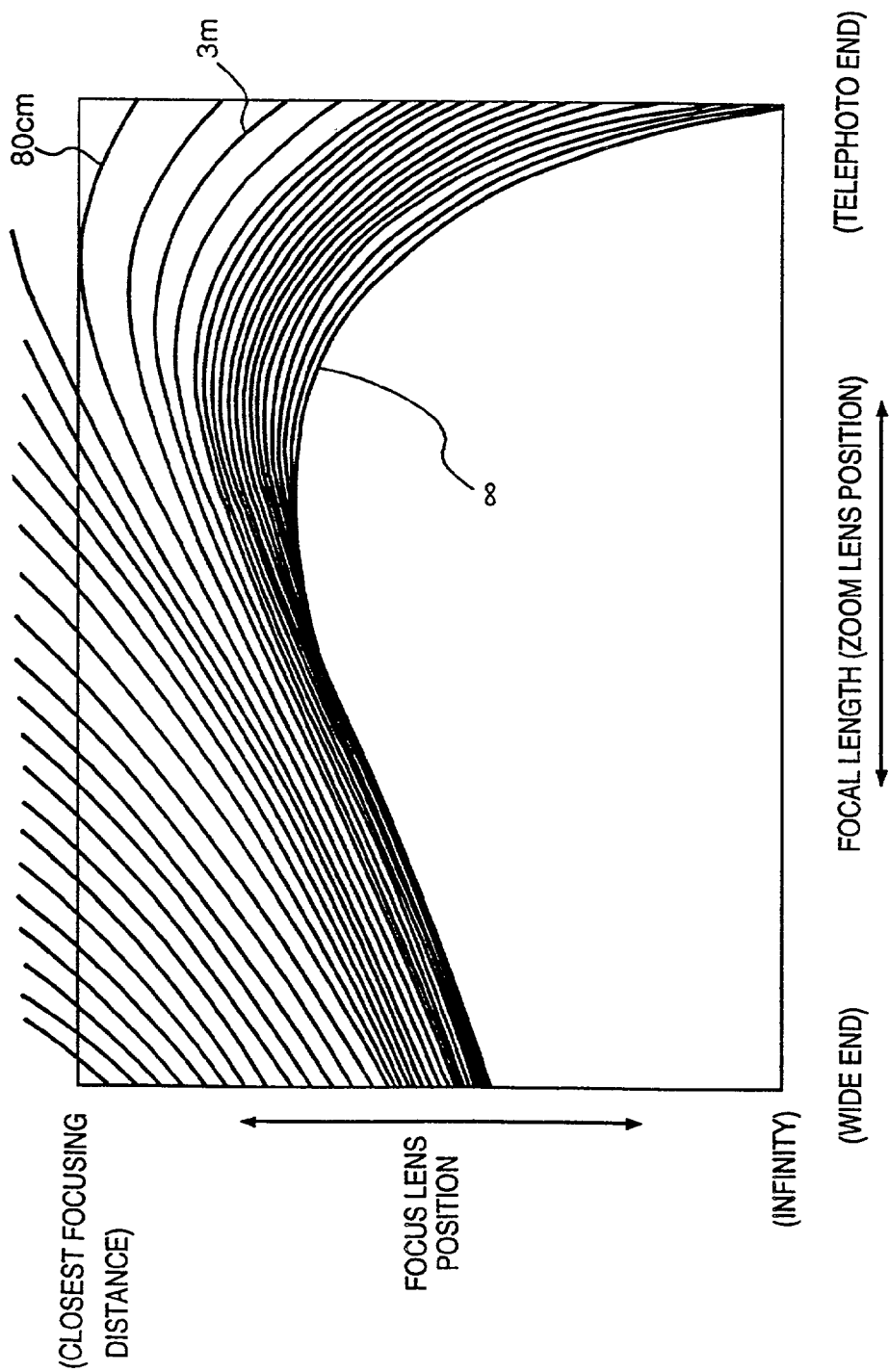
FIG. 6 is an illustration showing the locus of movement (lens cam data) of a focus lens used to maintain an in-focus state by compensating for the position of a focal plane which changes with a zooming operation of a zoom lens in the embodiment of the present invention.

FIG. 6 shows the result of continuous plotting of the position of the focus lens 105 for focusing an image on the imaging plane of each image sensing device while the object distance is changed at different focal lengths. In FIG. 6, the abscissa indicates the position (focal length) of the zoom lens, and the ordinate indicates the position of the focus lens. Each locus information represents the contents of the lens cam data of the ROM 120 of the microcomputer 116.

During the zooming operation, one of the loci shown in FIG. 6 is selected in accordance with the object distance, and the focus lens 105 is moved to trace that locus. This allows a zooming operation free from a blur.

In a lens system by which focusing is performed by using a lens (front lens) closest to an object, a compensating lens is provided independently of a variable power lens, and the variable power lens and the compensating lens are coupled by a mechanical cam ring.

A manual zoom knob, for example, is formed on this cam ring, and the focal length is manually changed. Even if the knob is moved as fast as possible, the cam ring rotates to trace the movement of the knob, and the variable power lens and the compensating lens move along a cam groove of the cam ring. Therefore, no blur is caused by the above operation as long as the focus lens is focused on an object.

In controlling the inner focus type lens system of this embodiment having the characteristics as described above, however, when a zooming operation is performed while the in-focus state is held, it is necessary to store the locus information (FIG. 6) as the lens cam data in the ROM 120 of the microcomputer 116, read out the locus information from the ROM 120 in accordance with the position or the moving velocity of the zoom lens 102, and move the focus lens 105 on the basis of the readout information.

Figure 7:
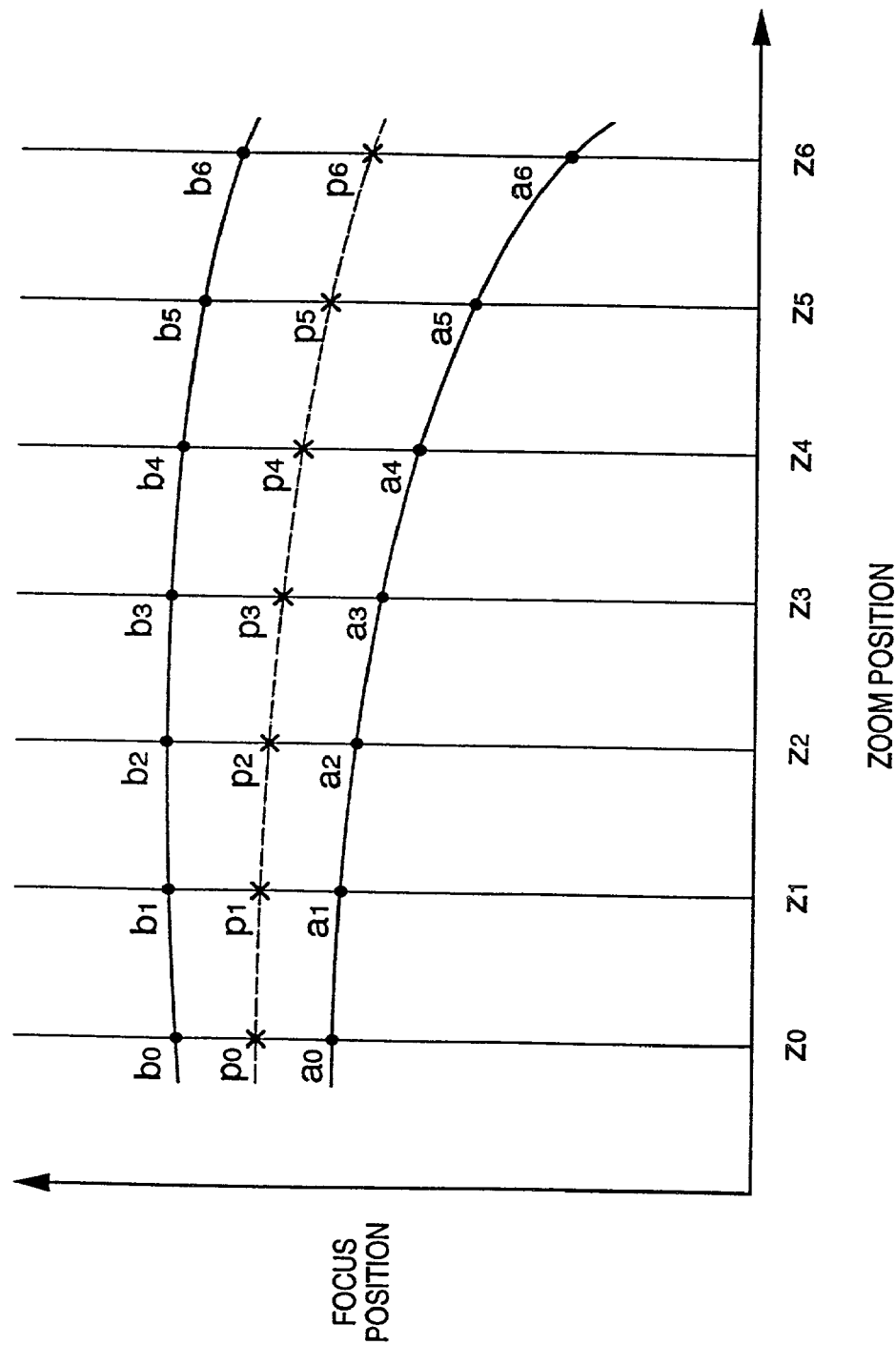
FIG. 7 is an illustration for explaining a method of calculating a locus not stored in the lens cam data from the information of a plurality of loci stored in the lens cam data in the embodiment of the present invention.

FIG. 7 is a graph for explaining one invented locus tracing method. In FIG. 7, reference symbols Z0, Z1, Z2 . . . , Z6 denote the positions of the zoom lens; and a0, a1, a2, . . . , a6 and b0, b1, b2, . . . , b6, representative loci stored as the lens cam data in the ROM 120 of the microcomputer 116.

Also, p0, p1, p2, . . . , p6 denote loci calculated on the basis of the above two loci. This locus calculation is done by the following equation:

$$p(n+1)=|p(n)-a(n)|/|b(n)-a(n)|*|b(n+1)-a(n+1)|+a(n+1) \quad (1)$$

In equation (1), if, for example, the focus lens is at p0 in FIG. 7, the ratio at which p0 internally divides a line segment b0−a0 is calculated, and the point at which a line segment b1−a1 is internally divided by this ratio is given as p1.

The focus lens moving velocity for holding the in-focus state can be known from this positional difference, p1−p0, and the time required for the zoom lens to move from Z0 to Z1.

An operation when there is no such limitation that the stop position of the zoom lens 102 must be on a boundary having the previously stored representative locus data will be described below.

Figure 8:
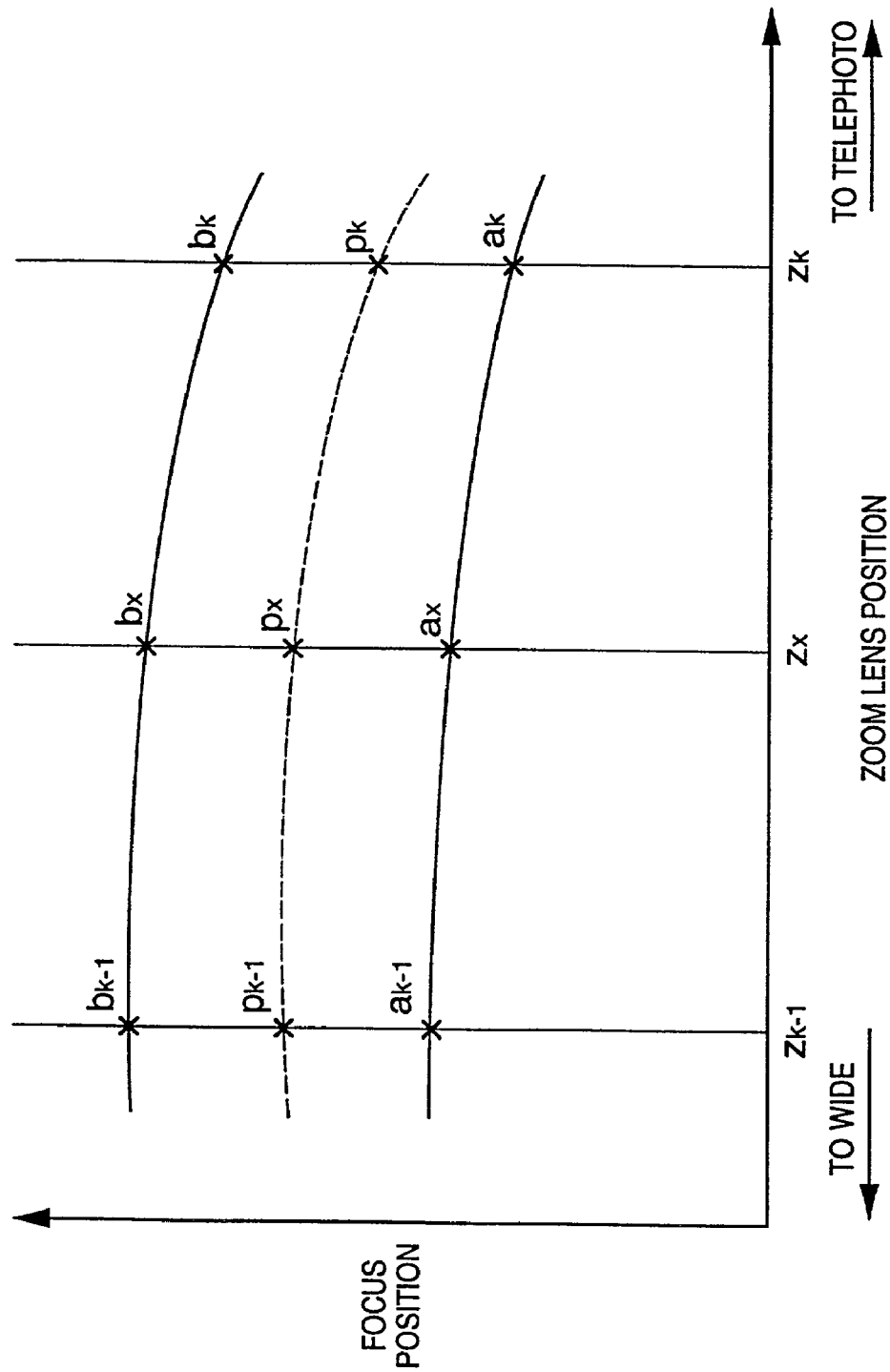
FIG. 8 is an illustration for explaining a method of calculating a locus not stored in the lens cam data from the information of a plurality of loci stored in the lens cam data in the embodiment of the present invention.

FIG. 8 is a graph for explaining a method of calculating a locus not stored on the basis of a plurality of pieces of stored locus information. FIG. 8 extracts a part of FIG. 7, and the zoom lens can take any arbitrary position.

In FIGS. 7 and 8, the ordinate indicates the focus lens position, and the abscissa indicates the zoom lens position. The representative locus positions (the focus lens positions with respect to the zoom lens positions) stored as the lens cam data in the ROM 120 of the microcomputer 116 are represented as follows for various object distances with respect to zoom lens positions Z0, Z1, . . . , Zk−1, Zk, . . . , Zn:

a0, a1, . . . , ak−1, ak, . . . , an
b0, b1, . . . , bk−1, bk, . . . , bn

If the zoom lens position is Zx not on a zoom boundary and the focus lens position is Px, ax and bx are calculated as follows:

$$ax=ak-(Zk-Zx)*(ak-ak-1)/(Zk-Zk-1) \quad (2)$$

$$bx=bk-(Zk-Zx)*(bk-bk-1)/(Zk-Zk-1) \quad (3)$$

That is, ax and bx can be calculated by internally dividing data having the same object distance of the four stored representative locus data (ak, ak−1, bk, and bk−1 in FIG. 8) by the internal ratio obtained from the current zoom lens position and the two zoom boundary positions (e.g., Zk and Zk−1 in FIG. 8) on the two sides of the current zoom lens position.

In this case, pk and pk−1 can be calculated, as shown in equation (1), by internally dividing data having the same focal length of the four stored representative data (ak, ak−1, bk, and bk−1 in FIG. 8) by the internal ratio obtained from ax, px, and bx.

When zooming is performed from wide to telephoto, the focus lens moving velocity for holding the in-focus state can be known from the positional difference between the focus position pk to be traced and the current focus position px and the time required for the zoom lens to move from Zx to Zk.

When zooming is performed from telephoto to wide, the focus lens moving velocity for holding the focused state can be known from the positional difference between the focus position pk−1 to be traced and the current focus position px and the time required for the zoom lens to move from Zx to Zk−1. The locus tracing method as described above is invented.

When the AF switch 131 is ON, it is necessary to trace the locus while maintaining the in-focus state. When the zoom lens moves in a direction from telephoto to wide, the diverged loci converge as can be seen from FIG. 6. Therefore, the in-focus state can be maintained by the above locus tracing method.

In a direction from wide to telephoto, however, a locus which the focus lens in the point of convergence is to trace is unknown. Consequently, the in-focus state cannot be maintained by the locus tracing method as above.

Figure 9A:
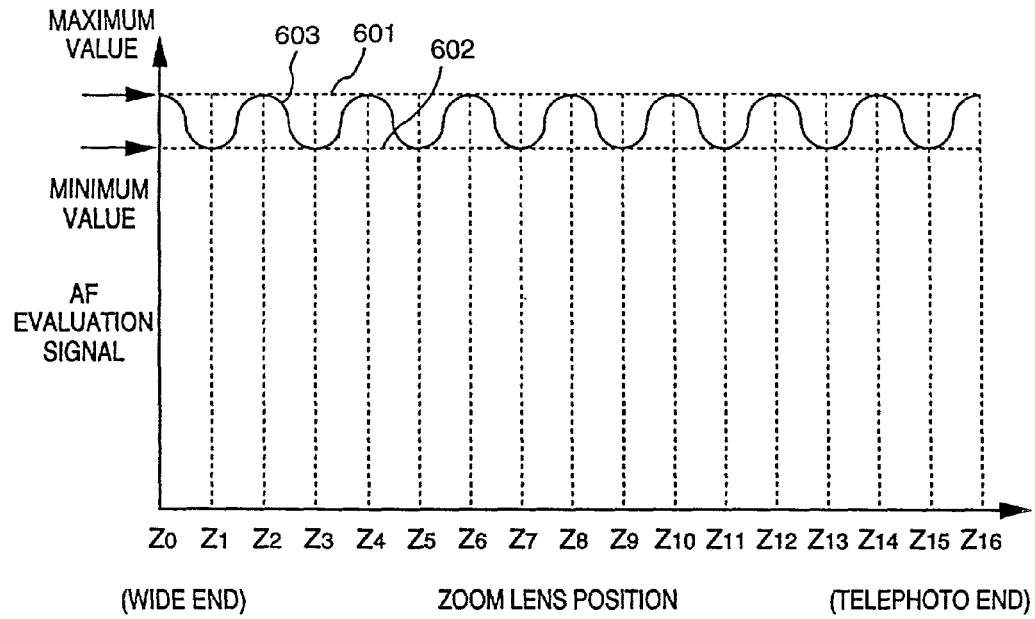
FIGS. 9A and 9B are illustrations for explaining an algorithm for allowing the focus lens to trace the locus stored in the lens cam data in the embodiment of the present invention.
Figure 9B:
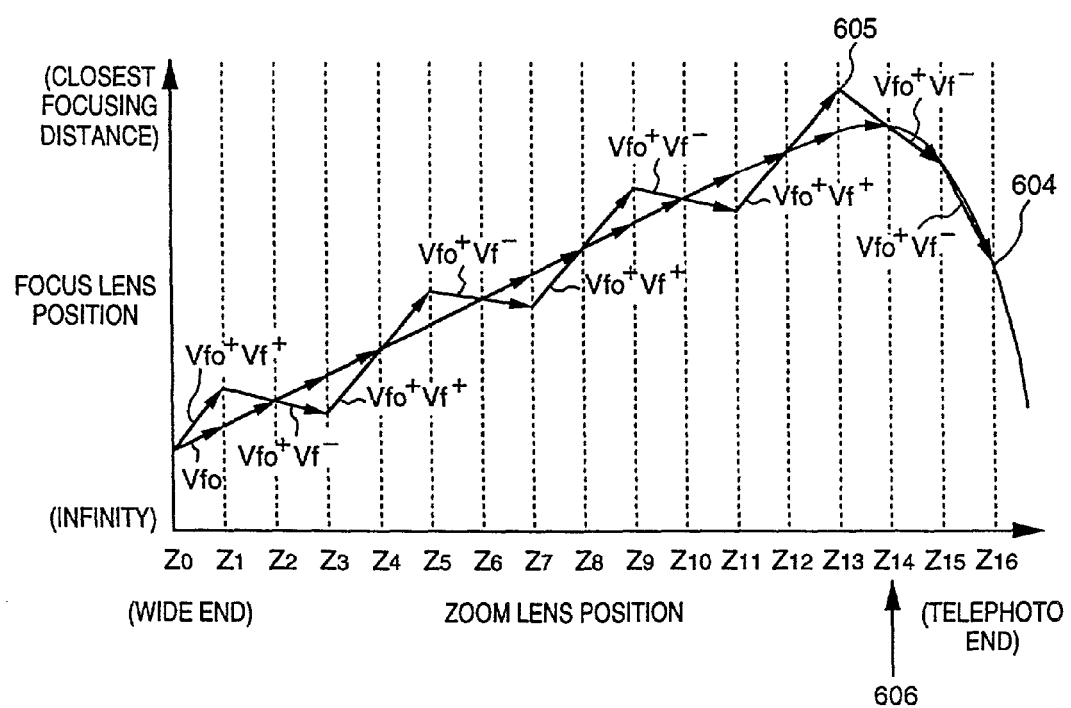

FIGS. 9A and 9B are graphs for explaining one locus tracing method invented to solve the above problem. In each of FIGS. 9A and 9B, the abscissa indicates the position of a zoom lens. In FIG. 9A, the ordinate indicates the level of a high-frequency component (sharpness signal) of a video signal as an AF evaluation signal. In FIG. 9B, the ordinate indicates the position of a focus lens.

Assume that in FIG. 9B, a focusing locus is a locus 604 when a zooming operation is performed for a certain object.

Assume also that a tracing velocity with respect to a locus indicated by lens cam data closer to a wide side than a zoom position 606 (Z14) is positive (the focus lens is moved to the closest focusing distance), and that a tracing velocity with respect to a locus indicated by lens cam data when the focus lens is moved in the direction of infinity on a telephoto side from the position 606 is negative.

When the focus lens traces the locus 604 while being kept in the in-focus state, the magnitude of the sharpness signal is as indicated by 601 in FIG. 9A. It is generally known that a zoom lens kept in the in-focus state has an almost fixed sharpness signal level.

Assume that in FIG. 9B, a focus lens moving velocity for tracking the focusing locus 604 during a zooming operation is Vf0. When an actual focus lens moving velocity is Vf and a zooming operation is performed by increasing or decreasing Vf with respect to Vf0 for tracing the locus 604, the resulting locus is zigzagged as indicated by reference numeral 605.

Consequently, the sharpness signal level so changes as to form peaks and valleys as indicated by reference numeral 603. The magnitude of the level 603 is a maximum at positions where the loci 604 and 605 intersect (at even-numbered points of Z0, Z1, . . . , Z16) and is a minimum at odd-numbered points where the moving direction vectors of the locus 605 are switched.

Reference numeral 602 denotes a minimum value of the level 603. When a level TH1 of the value 602 is set and the moving direction vectors of the locus 605 are switched every time the magnitude of the level 603 equals the level TH1, the focus lens moving direction after the switching can be set in a direction in which the movement approaches the in-focus locus 604.

That is, each time an image is blurred by the difference between the sharpness signal levels 601 and 602 (TH1), the moving direction and velocity of the focus lens are so controlled as to decrease the blur. Consequently, a zooming operation by which a degree (amount) of blur is suppressed can be performed.

The use of the above method is effective even in a zooming operation from wide to telephoto, as shown in FIG. 6, in which converged loci diverge. That is, even if the in-focus velocity Vf0 is unknown, the switching operation is repeated as indicated by 605 (in accordance with a change in the sharpness signal level) while the focus lens moving velocity Vf is controlled with respect to the tracing velocity (calculated by using p(n+1) obtained from equation (1)) explained in FIG. 6. As a consequence, it is possible to select an in-focus locus by which the sharpness signal level is not decreased below the level 602 (TH1), i.e., a predetermined amount or more of blur is not produced.

Assuming a positive compensating velocity is Vf+ and a negative compensating velocity is Vf−, the focus lens moving velocity Vf is determined by $$vf = vf0 + vf+ \quad (4)$$

$$vf0 + Vf- \quad (5)$$

In order that no deviation is produced when the tracing locus is selected by the above method of zooming operation, the compensating velocities Vf+ and Vf− are so determined that the internal angle of the two vectors of Vf obtained by equations (4) and (5) is divided into two equal parts.

Another method is proposed in which the increasing/decreasing period of the sharpness signal is changed by changing the compensating amount by using the compensating velocity in accordance with the object, the focal length, or the depth of field, thereby improving the accuracy of the selection of the tracing locus.

In the embodiment as described above, the lens assembly includes the focus lens locus information and the AF circuit, and a plurality of evaluation values are transmitted from the camera main body to the lens assembly. Accordingly, the lens assembly can be informed of the operation state of the focus lens, and this makes it possible to realize complicated control of the focus lens by using the lens assembly capable of a zooming operation. Consequently, a video camera system with which various lens assemblies can be used is realized without complicating the construction of the camera main body.

<First Modification of Embodiment>

In this modification, evaluation values and version information indicating the type and the contents of each evaluation value are transferred from the camera 128 to the lens assembly 127 and supplied to the microcomputer 116 to perform an automatic focusing operation. The rest of the configuration is identical with that of the above embodiment and so a detailed description thereof will be omitted.

The version information of the evaluation value will be described below. This version information allows the selection of an optimum signal as an AF evaluation value in accordance with the function and performance of a camera main body. For example, when the sensitivity or the number of pixels of the image sensing devices 106, 107, and 108 is greatly increased compared to that of conventional devices and consequently the frequency characteristics or the dynamic range of a video signal is improved, it is predicted that the frequency component of a signal indicating an in-focus degree shifts to higher frequencies and a change in the evaluation value when the lens is defocused by a minimum diameter of a circle of confusion becomes larger.

Accordingly, it is necessary to change the filter characteristics of the TE-LPF 214 and the FE-LPF 215 from the conventional settings, and the obtained AF evaluation value becomes different from the conventional evaluation value.

Assuming the former version of an evaluation value is Ver.1 and the latter version is Ver.2, FIGS. 10A and 10B illustrate the detailed contents of the versions and the evaluation values transmitted from the camera main body to the lens assembly.

In this modification, it is assumed, for the sake of simplicity, that the type of evaluation value remains unchanged even when its version changes. However, the present invention is not limited to this modification, provided that the lens assembly as the reception side can control the number of words to be transmitted and the type or contents of an evaluation value of each word.

As described above, the characteristic of an evaluation value changes in accordance with the version. Therefore, AF with higher performance can be realized by making the AF control algorithm meet the characteristic.

FIG. 10A shows the AF evaluation values of the two versions transmitted from the camera main body to the lens assembly. FIG. 10B shows the contents transmitted from the lens assembly to the camera main body.

The algorithm of an automatic focusing operation performed by the microcomputer 116 of the lens assembly will be described below with reference to FIG. 11.

In this modification, the microcomputer 116 corresponds to AF control of Ver.2. The camera main body corresponds to both Ver.1 and Ver.2.

Figure 11:
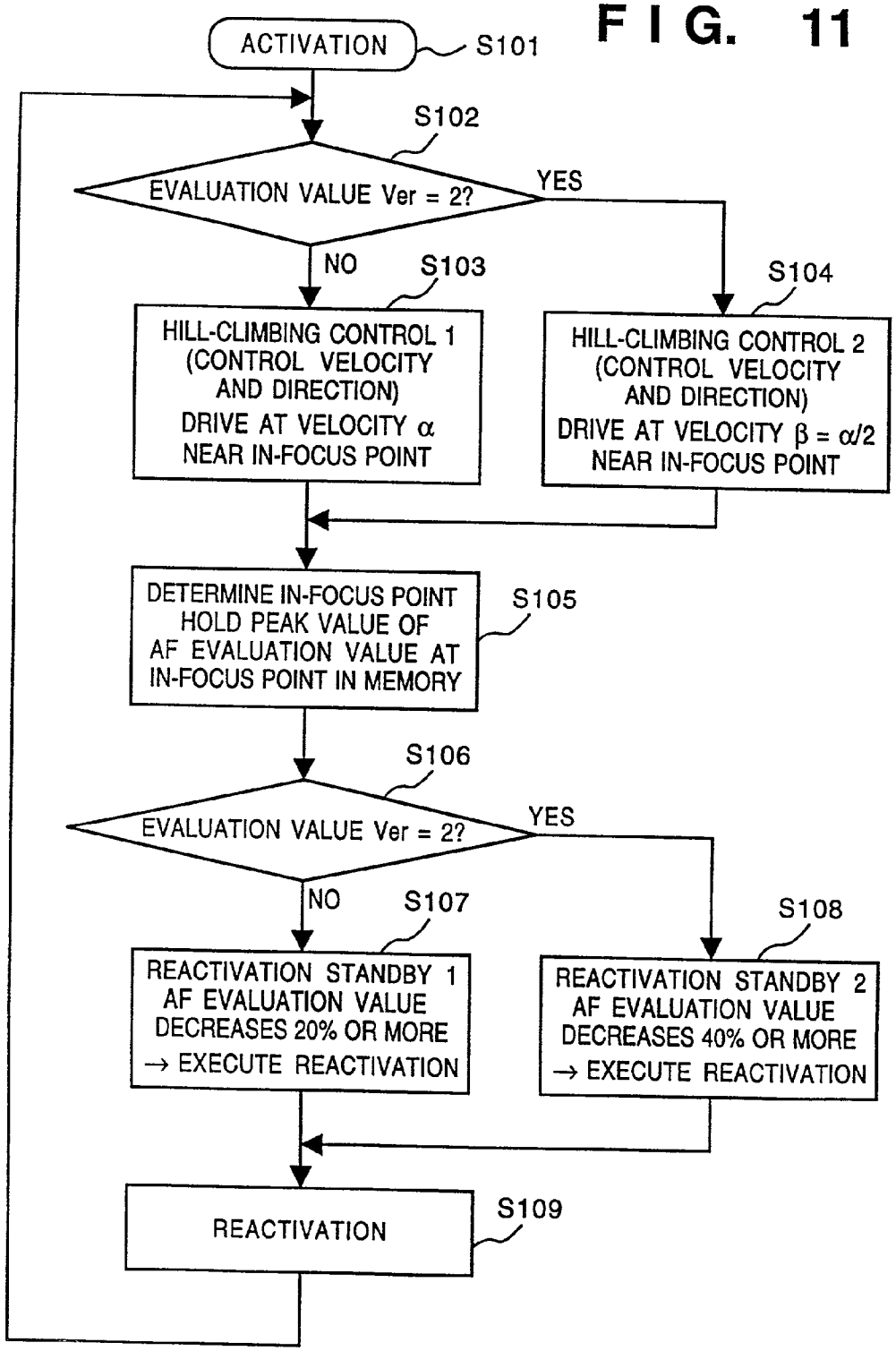
FIG. 11 is a flow chart for explaining the processing performed by a microcomputer of a lens assembly according to the first modification of the embodiment of the present invention.

FIG. 11 is a flow chart showing a focusing operation performed by the lens assembly in the first modification of the embodiment of the present invention.

The microcomputer 116 activates the system in step S101 and checks the version of an evaluation value in step S102. If the version is Ver.1, the microcomputer 116 executes hill-climbing control 1 in step S103. If the version is Ver.2, the microcomputer 116 executes hill-climbing control 2 in step S104. If the level of the TE or FE peak is low, the microcomputer 116 determines that the focus lens is far from the in-focus point and drives the focus lens at a high velocity (velocity control). The microcomputer 116 controls the search for the in-focus point by performing direction control by primarily using the TE line peak integral evaluation value near the in-focus point and the FE line peak evaluation value if the lens is far from the in-focus point.

Assuming, as described above, that an evaluation value of Ver.2 corresponds to a video signal obtained from a high-resolution, high-sensitivity image sensing device, in the vicinity of the in-focus point, the image is blurred more by an evaluation value of Ver.2 than that of Ver.1 when the focus lens is moved the same amount.

Accordingly, the lens moving velocity near the in-focus point in step 104 is set to be lower than that in step S103 (S103: velocity α, S104: velocity β=a/2).

In step S105, the microcomputer 116 determines the peak of the characteristic curve (the in-focus point) from the absolute value of the TE or FE peak evaluation value and a change in the TE line peak integral evaluation value. The microcomputer 116 stops the lens at a point at which the level is highest, and stores these evaluation values in the memory.

In step S106, the microcomputer 116 performs the same processing as in step S102. If the version of an evaluation value is Ver.1, the flow advances to reactivation standby 1 in step S107. If the version is Ver.2, the flow advances to reactivation standby 2 in step S108.

In the reactivation standby, the microcomputer 116 detects whether the level of the TE or FE peak evaluation value decreases from the level stored in the memory in step S105. If the decrease is detected, the flow advances to step S109 to perform reactivation.

If an evaluation value of Ver.2 corresponds to a high-resolution, high-sensitivity image sensing signal, the level of an evaluation value of Ver.2 tends to change more than that of Ver.1 for visually the same blur. Therefore, the evaluation value variation threshold for determining reactivation in reactivation standby 2 in step S108 is set to be larger than that in step S107 (in this modification, reactivation is performed when the level changes 20% or more from the stored level in step S107 and when the level changes 40% or more from the stored level in step S108).

In the loop of the automatic focusing operation as described above, the velocity control of the focus lens is performed by using the TE/FE peak. A characteristic curve is predicted by checking the object by using the Y peak evaluation value or the Max-Min evaluation value, and the absolute value for determining the peak of the characteristic curve and the change in the TE line peak integral evaluation value are determined on the basis of the characteristic curve.

In the above explanation, it is assumed that the version of the lens assembly is Ver.2. If the lens assembly is Ver.1, it is only necessary to perform the processing in the order of steps S101, S103, S105, S106, S107, and S109 in FIG. 11.

The communication timings between the camera main body and the lens will be described below with reference to FIG. 5. As described above, the AF evaluation values read out by the microcomputer of the main body are transferred to the microcomputer of the lens immediately after the next vertical sync signal in synchronism with the vertical sync signal (V synchronization).

Figure 12:
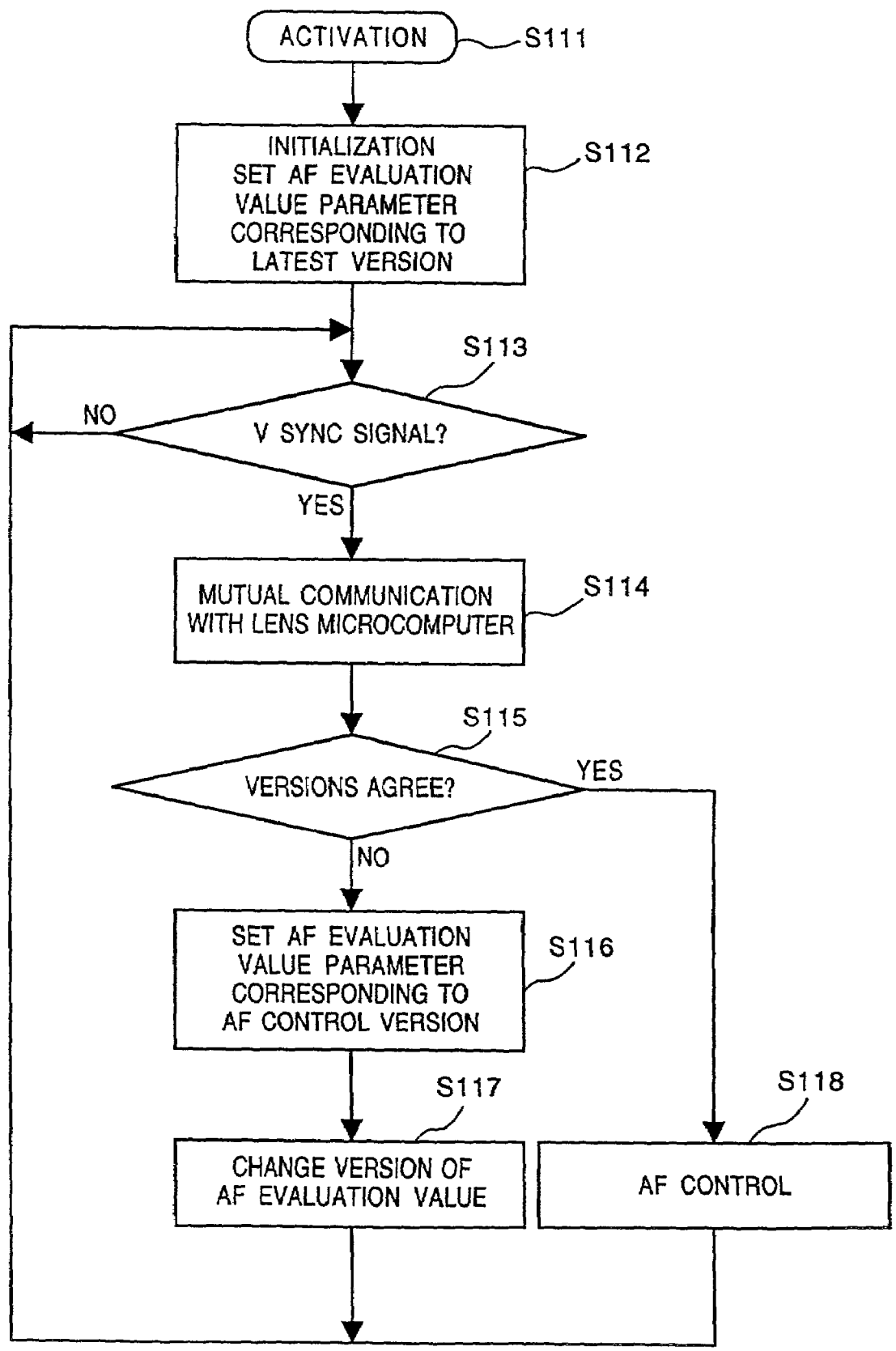
FIG. 12 is a flow chart for explaining a method of matching the versions of communications between the camera and the lens assembly according to the first modification of the embodiment of the present invention.

FIG. 12 is a flow chart for explaining the method of matching the versions of communications between the camera main body and the lens. This flow chart shows the processing performed by the microcomputer 114 of the camera main body. In FIG. 12, it is assumed that the camera main body corresponds to the evaluation values of Ver.2 in FIG. 10A and the lens assembly corresponds to both the AF control versions Ver.1 and Ver.2 in FIG. 10B.

In step S111, the microcomputer 114 activates the system. In step S112, the microcomputer 114 performs initialization, i.e., performs settings for generating AF evaluation values corresponding to the latest version (in this case Ver.2) of the microcomputer of the main body (in the case explained in FIG. 11, the microcomputer 114 sets the filter characteristics of the TE-LPF 214 and the FE-LPF 215 so that higher frequencies than that in conventional methods can be extracted).

To communicate with the microcomputer 116 at the communication timings shown in FIG. 5, the microcomputer 114 waits in step S113 until the vertical sync signal comes. In step S114, the microcomputer 114 performs mutual communication, i.e., exchanges data as illustrated in FIGS. 4A and 4B.

In step S115, the microcomputer 114 checks whether the version of the transmitted evaluation value agrees with the control version by which the microcomputer of the lens can perform AF control.

If the versions agree, the flow advances to step S118, and the microcomputer 114 executes usual control of the camera, which includes AE (Automatic Exposure) control, AWB (Automatic White Balance) control, and the other processing to sense an image. The microcomputer 114 then waits in step S113 until the next vertical sync signal comes.

If the versions disagree in step S115, the flow advances to step S116, and the microcomputer 114 performs settings for generating AF evaluation values corresponding to the AF control version of the lens assembly. The microcomputer 114 changes the version of the evaluation value in step S117, and the flow returns to step S113.

In this modification as described above, upgrading is realized by transferring the type information of a focus signal. For example, a focus signal newly required in accordance with the progress of technologies such as a high-pixel CCD can be added to the conventional focus signal, or the contents or type of the signal can be changed. It is also possible to provide a highly expandable video system by optimizing AF control in accordance with the version of the transferred focus signal.

<Second Modification of Embodiment>

Figure 13:
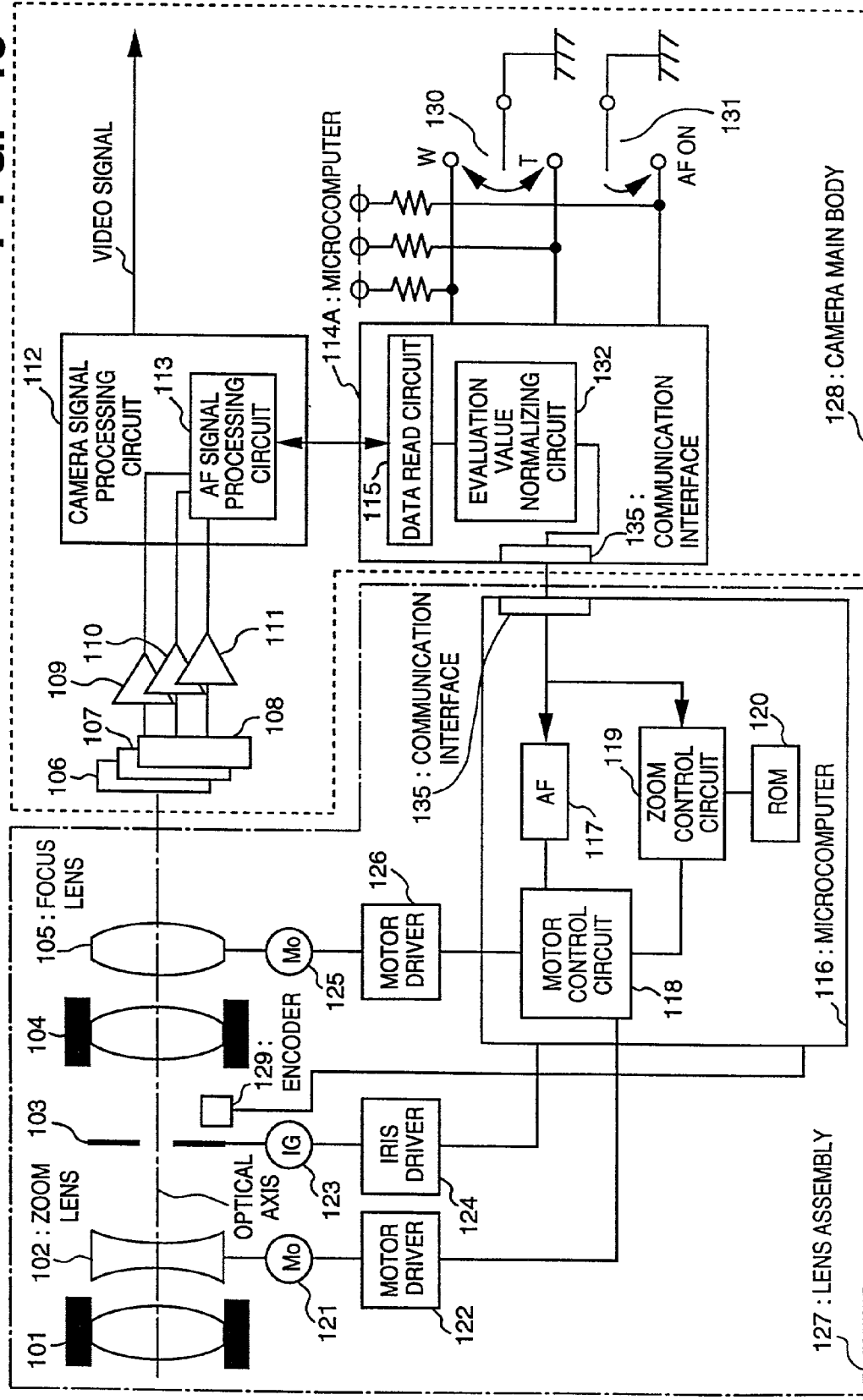
FIG. 13 is a block diagram of an interchangeable lens video camera system according to the second modification of the embodiment of the present invention.
Figure 15:
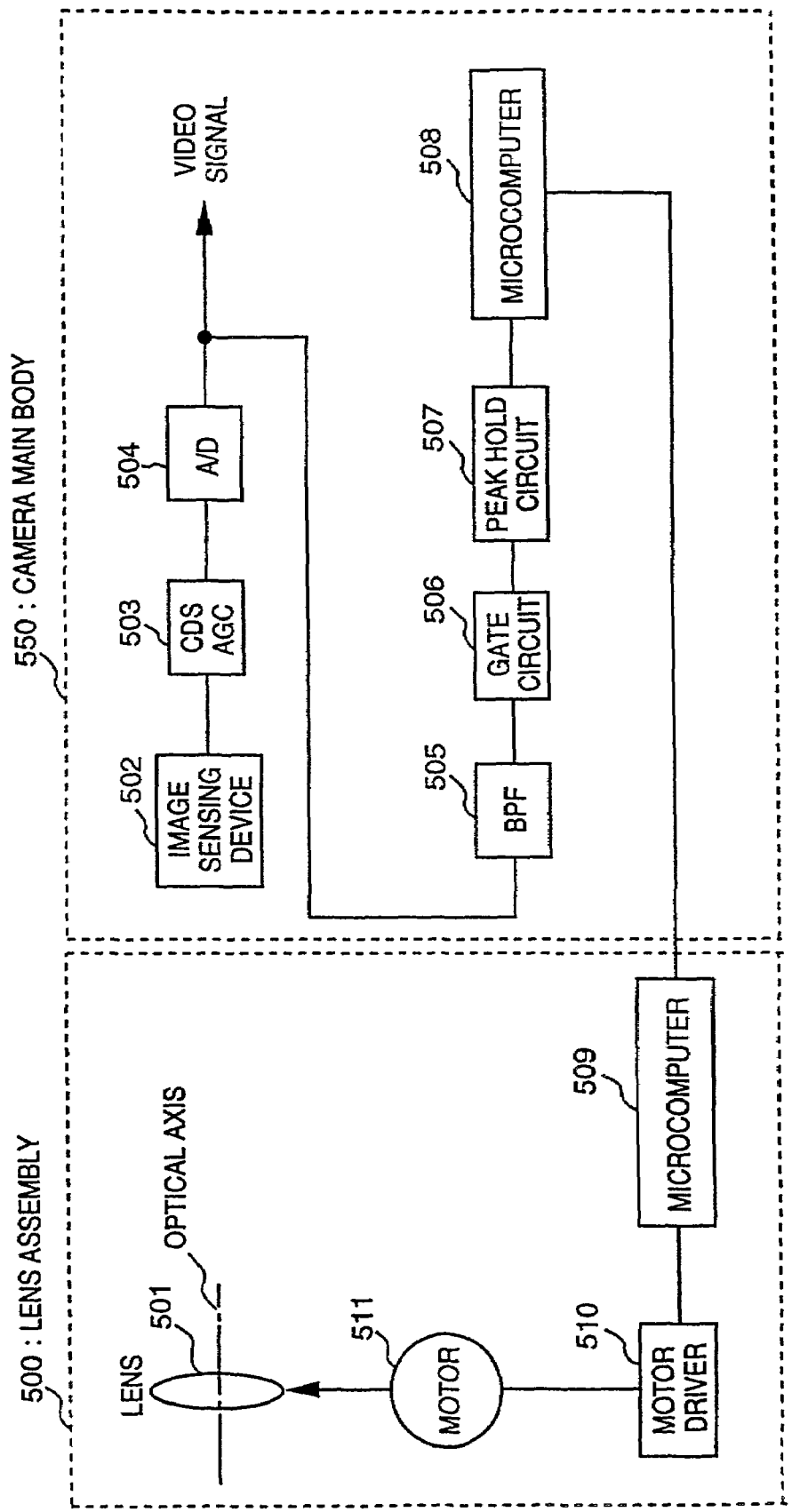
FIG. 15 is a block diagram showing the configuration of an interchangeable lens video camera system as one prior art.
Figure 16:
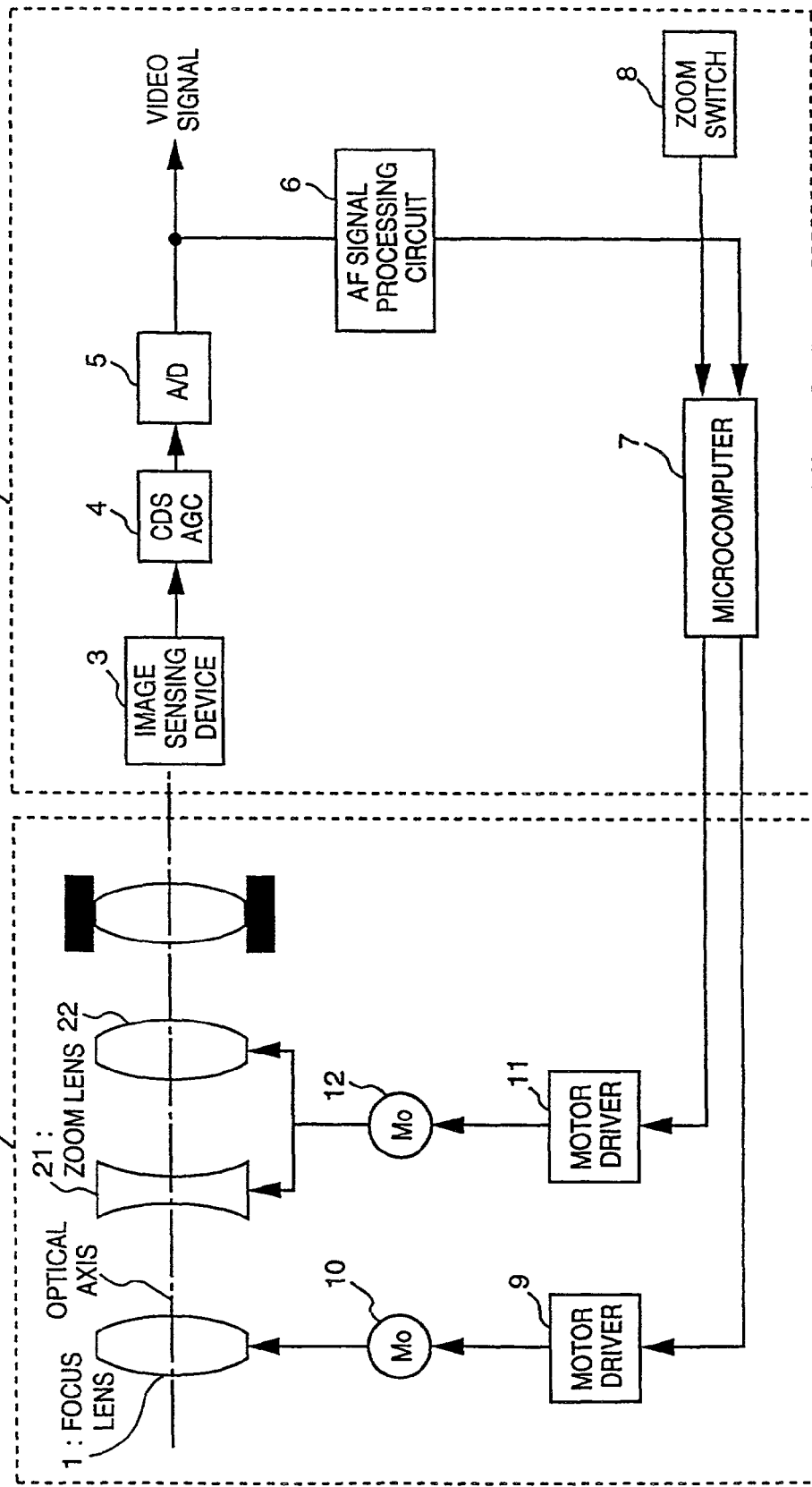
FIG. 16 is a block diagram showing the configuration of an interchangeable lens video camera system as another prior art.

The second modification of the embodiment of the present invention will be described below. FIG. 13 is a block diagram showing the configuration of an interchangeable lens video camera system of this modification. FIG. 13 differs from the video system in FIG. 1 in that a microcomputer 114A incorporates an evaluation value normalizing circuit 132. The rest of the configuration including the microcomputer 114A is identical with the above embodiment (the same reference numerals as in FIG. 1 denote parts having the same functions in FIG. 13) and a detailed description thereof will be omitted.

In this modification, an AF evaluation value generated by the AF signal processing circuit 113 is read out at a period which is an integral multiple of a vertical sync signal by the data read circuit 115 of the microcomputer 114A of the camera main body. The readout evaluation value is normalized by the evaluation value normalizing circuit 132 and transferred to the microcomputer 116 of the lens assembly.

The evaluation value normalizing circuit 132 will be described below with reference to FIGS. 14A to 14D. FIGS. 14A to 14D are graphs showing changes in the TE peak evaluation value when the lens is searched from the closest focusing distance to infinity while a certain object is imaged.

FIGS. 14A and 14C show the values read out by the data read circuits 115 of different cameras (image sensing means) when an image of the same object is taken by the same lens.

These output levels are different although an image of the same object is taken by the same lens. The evaluation value normalizing circuit 132 determines levels such that the signal levels at two points P1 and P2 have predetermined values and, in accordance with the levels thus determined, shifts, compresses, or expands the whole signal level. is The output from the evaluation value normalizing circuit 132 in FIG. 14A is shown in FIG. 14B, and the output from the evaluation value normalizing circuit 132 in FIG. 14C is shown in FIG. 14D. Although the input levels to the evaluation value normalizing circuits 132 shown in FIGS. 14A and 14C are different, the output levels in FIGS. 14B and 14D are almost the same. The evaluation value normalizing circuit 132 performs similar normalization for other evaluation values.

That is, the evaluation value normalizing circuit 132 receives the TE peak values in the frames L, C, and R output from the buffers 228 to 230, the TE peak integral values and the FE peak integral values in the frames L, C, and R output from the buffers 238 to 243, and the contrast peak values in the frames L, C, and R output from the buffers 250 to 252. The evaluation value normalizing circuit 132 performs maximum value level shift processing and minimum value level shift processing for these input values. In the maximum value level shift processing, the peak value of each input signal level is compressed or expanded and forcibly matched with the level of P1 in FIGS. 14B and 14D. In the minimum value level shift processing, the minimum value of each input signal level is compressed or expanded and forcibly matched with the level of P2 in FIGS. 14B and 14D. Although FIGS. 14A to 14D illustrate the TE peak, other evaluation values described previously are similarly normalized and transmitted to the microcomputer 116 of the lens assembly 127.

Consequently, even if variations are present in the image sensing devices 106 to 108 or the AF signal processing circuit 113 of the camera main body, each focus evaluation value has a normalized predetermined characteristic. Accordingly, even when a plurality of camera main bodies having different image sensing means are combined with different lens assemblies, a common output can be transferred to these lens assemblies by normalizing the focus signal. Additionally, since the respective optimum response characteristics can be determined in the individual lens assemblies, objects to be imaged can be focused more stably in a taking area under various taking conditions.

As many apparently widely different embodiments of the present invention can be made without departing from the spirit and scope thereof, it is to be understood that the invention is not limited to the specific embodiments thereof except as defined in the appended claims.

What is claimed is:

1. An interchangeable lens assembly video camera system comprising a camera and an interchangeable lens assembly, wherein said camera comprises extracting means for extracting a predetermined image signal component varying depending on a focus state from an image sensing signal corresponding to one or a plurality of focus detection areas defined on an image sensing plane of said camera, an operation member for manipulating a zooming operation, and transmitting means for transmitting the predetermined image signal component and a state of said operation member to said lens assembly;

said lens assembly comprises receiving means for receiving the predetermined image signal component and the state of said operation member from said camera, a zoom lens for performing a zooming operation;

a focus lens for maintaining an in-focus state during the zooming operation, memory means for storing data representing a positional relationship between said zoom lens and said focus lens, zoom lens driving means for driving said zoom lens in accordance with the state of said operation member, control means for judging an in-focus state on the basis of the predetermined image signal component and determining a driving direction and a driving velocity of said focus lens while compensating for a movement of a focal plane caused by the zooming operation of said zoom lens on the basis of the data, and focus lens driving means for driving said focus lens in accordance with the driving direction and the driving velocity; and said lens assembly controls operations of said focus lens and said zoom lens.

2. The system according to claim 1, wherein said extracting means comprises a plurality of filter means for extracting a signal of a predetermined frequency component as a focus evaluating signal from the image sensing signal.

3. The system according to claim 2, wherein said extracting means further comprises peak value detecting means for detecting a peak value of a luminance component in the image sensing signal.

4. The system according to claim 2, wherein said extracting means further comprises contrast component detecting means for detecting a contrast component in the image sensing signal.

5. The system according to claim 4, wherein said extracting means further comprises peak holding means for detecting the contrast component by holding a peak value of a difference between a maximum value and a minimum value of the luminance component.

6. A lens assembly which can be detachably attached to a camera including focus detecting means, comprising:
  receiving means for receiving a predetermined image signal component extracted from an image signal and varying dependent on a focus state and a state of an operation member for manipulating a zooming operation, both of which are transmitted from said camera;
  a zoom lens for performing a zooming operation;
  a focus lens for maintaining an in-focus state during the zooming operation;
  memory means for storing data representing a positional relationship between said zoom lens and said focus lens;
  zoom lens driving means for driving said zoom lens in accordance with the state of said operation member;
  control means for judging the in-focus state on the basis of the predetermined image signal component and determining a driving direction and a driving velocity of said focus lens while compensating for a movement of a focal plane caused by the zooming operation of said zoom lens on the basis of the data; and
  focus lens driving means for driving said focus lens in accordance with the driving direction and the driving velocity.

7. A camera to which a lens assembly can be detachably attached, comprising:
  extracting means for extracting a predetermined image signal component varying depending on a focus state from an image sensing signal corresponding to one or a plurality of focus detection areas defined on an image sensing plane of said camera;
  an operation member for manipulating a zooming operation of a zoom lens of said lens assembly; and
  transmitting means for transmitting the predetermined image signal component and a state of said operation member to said lens assembly.

8. The camera according to claim 7, wherein said extracting means comprises a plurality of filter means for extracting a signal of a predetermined frequency component as a focus evaluating signal from the image sensing signal.

9. The camera according to claim 8, wherein said extracting means further comprises peak value detecting means for detecting a peak value of a luminance component in the image sensing signal.

10. The camera according to clam 8, wherein said extracting means further comprising contrast component detecting means for detecting a contrast component in the image sensing signal.

11. The camera according to claim 10, wherein said extracting means further comprises peak holding means for detecting the contrast component by holding a peak value of a difference between a maximum value and a minimum value of the luminance component.

* * * * *

UNITED STATES PATENT AND TRADEMARK OFFICE
CERTIFICATE OF CORRECTION

PATENT NO. : 7,098,954 B2
APPLICATION NO. : 10/122343
DATED : August 29, 2006
INVENTOR(S) : Suda et al.

It is certified that error appears in the above-identified patent and that said Letters Patent is hereby corrected as shown below:

In Column 19, Line 33, delete "is".

In Column 19, Line 33 to Line 42, beginning with "The ouput from the evaluation value..." and ending with "evaluation values", please make it its own paragraph.

Signed and Sealed this

Twenty-third Day of January, 2007

JON W. DUDAS
*Director of the United States Patent and Trademark Office*